United States Patent
Gao et al.

(10) Patent No.: US 11,856,540 B2
(45) Date of Patent: Dec. 26, 2023

(54) METHODS AND APPARATUSES FOR SYNCHRONIZATION SIGNAL TRANSMISSION

(71) Applicant: NEC CORPORATION, Tokyo (JP)

(72) Inventors: Yukai Gao, Chaoyang District (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/532,005

(22) Filed: Nov. 22, 2021

(65) Prior Publication Data

US 2022/0159592 A1    May 19, 2022

Related U.S. Application Data

(63) Continuation of application No. 16/638,004, filed on Feb. 10, 2020, now Pat. No. 11,212,762.

(51) Int. Cl.
| | |
|---|---|
| *H04W 56/00* | (2009.01) |
| *H04L 5/00* | (2006.01) |
| *H04L 5/10* | (2006.01) |
| *H04W 72/0446* | (2023.01) |
| *H04W 72/30* | (2023.01) |

(52) U.S. Cl.
CPC ......... *H04W 56/001* (2013.01); *H04L 5/0051* (2013.01); *H04L 5/0094* (2013.01); *H04L 5/10* (2013.01); *H04W 72/0446* (2013.01); *H04W 72/30* (2023.01)

(58) Field of Classification Search
None
See application file for complete search history.

(56) References Cited

U.S. PATENT DOCUMENTS

| | | | |
|---|---|---|---|
| 10,616,843 | B2 | 4/2020 | Huang et al. |
| 2015/0156758 | A1 | 6/2015 | Suzuki et al. |
| 2017/0006578 | A1* | 1/2017 | Rico Alvarino ...... H04L 5/0048 |
| 2018/0262308 | A1* | 9/2018 | Si .......................... H04L 5/0051 |
| 2018/0270772 | A1* | 9/2018 | Ly .......................... H04L 5/0048 |

(Continued)

FOREIGN PATENT DOCUMENTS

| | | | |
|---|---|---|---|
| BR | 112019019095 A2 * | 4/2020 | .......... H04J 11/0073 |
| CN | 103701733 A | 4/2014 | |

(Continued)

OTHER PUBLICATIONS

Office Action dated Jun. 29, 2021 in Japanese Application No. 2020-507548.

(Continued)

*Primary Examiner* — Ajit Patel
(74) *Attorney, Agent, or Firm* — Sughrue Mion, PLLC

(57) ABSTRACT

Embodiments of the present disclosure relate to methods and an apparatuses for synchronization signal (SS) transmission. In example embodiments, a method implemented in a network device is provided. According to the method, information on a plurality of SS blocks to be transmitted by the network device is determined based on at least one of a frequency range and a value of subcarrier spacing. The information at least in part indicates timing for transmitting the plurality of SS blocks The plurality of SS blocks are transmitted to at least one terminal device based on the determined information.

17 Claims, 12 Drawing Sheets

(56) References Cited

U.S. PATENT DOCUMENTS

| | | | |
|---|---|---|---|
| 2018/0368054 A1* | 12/2018 | Sheng | H04W 72/005 |
| 2019/0058620 A1* | 2/2019 | Liu | H04L 27/2613 |
| 2019/0200306 A1 | 6/2019 | Ko et al. | |
| 2019/0357159 A1* | 11/2019 | Pan | H04L 5/0007 |
| 2019/0387488 A1* | 12/2019 | Wang | H04L 5/10 |
| 2020/0100221 A1 | 3/2020 | Tang et al. | |
| 2020/0119965 A1 | 4/2020 | Harada et al. | |
| 2020/0119966 A1 | 4/2020 | Takeda et al. | |
| 2020/0128498 A1 | 4/2020 | Harada et al. | |
| 2020/0162217 A1 | 5/2020 | Liu et al. | |
| 2020/0178307 A1 | 6/2020 | Ohara et al. | |
| 2020/0204315 A1 | 6/2020 | Zhao et al. | |
| 2020/0213051 A1 | 7/2020 | Wu et al. | |
| 2020/0328869 A1 | 10/2020 | Liu et al. | |
| 2021/0045144 A1 | 2/2021 | Kim et al. | |
| 2021/0120511 A1 | 4/2021 | Wang et al. | |

FOREIGN PATENT DOCUMENTS

| | | | | |
|---|---|---|---|---|
| CN | 106797611 A * | 5/2017 | | H04L 5/0008 |
| CN | 106797611 A | 5/2017 | | |
| EP | 3934331 A1 * | 1/2022 | | H04L 5/00 |
| JP | WO2007142194 A1 | 10/2009 | | |
| JP | 2011-97386 A | 5/2011 | | |
| WO | 2013/069579 A1 | 5/2013 | | |

OTHER PUBLICATIONS

Communication dated Jun. 29, 2020 by the European Patent Office in application No. 17921189.1.
Convida Wireless, "Discussion on SS Block Design", 3GPP TSG RAN WG1 Meeting #88bis, R1-1705831, Spokane, USA, Apr. 3-7, 2017 (6 pages total).
Ericsson, "Timing indication based on SS block", 3GPP TSG-RAN WG1 NR Ad-Hoc#2, RI-1711373, Jun. 27-20, 2017, 7 pages.
FiberHome, "Discussion on time index indication", R1-1712275, 3GPP TSG-RAN WG1 Meeting #90, Aug. 21-25, 2017, 3 pages.
Intel Corporation, "SS block Composition", 3GPP TSG RAN WG1 Meeting Ad-hoc#2, R1-1711648, Jun. 27-30, 2017, 11 pages.
International Search Report of PCT/CN2017/097222 dated Mar. 27, 2018 [PCT/ISA/210].
LG Electronics, "Discussion on DMRS design for NR-PBCH", 3GPP TSG RAN WG1 Meeting NR#2, R1-1710264, Qingdao, P.R. China Jun. 27-30, 2017 (7 pages total).
NTT Docomo, Inc., "Discussion on NR-PBCH design and SS block composition", R1-1711622, 3GPP TSG RAN WG1 NR Ad-Hoc#2, Jun. 27-30, 2017, 10 pages.
NTT Docomo, Inc., "Discussion on timing indication based on SS block for NR", 3GPP TSG RAN WG1 NR Ad-Hoc#2, R1-1711058, Qingdao, P.R. China Jun. 27-30, 2017 (11 pages total).
Office Action dated Aug. 3, 2021 in Chinese Application No. 201780095830.9.
Vivo, "Discussion on SS block time index indication", 3GPP TSG RAN WG1 Meeting #89, R1-1707227, Hangzhou, P.R. China May 15-19, 2017 (6 pages total).
Written Opinion of PCT/CN2017/097222 dated Mar. 27, 2018 [PCT/ISA/237].
ZTE, "Considerations for LTE Downlink DMRS Overhead Reduction", 3GPP TSG RAN WG1 #89, R1-1707187, Hangzhou, China, May 15-19, 2017 (5 pages total).
ZTE, "Timing indication based on SS blocks", 3GPP TSG RAN WG1 NR Ad-Hoc#2, R1-1709886, Jun. 27-30, 2017, 7 pages.

* cited by examiner

METHODS AND APPARATUSES FOR SYNCHRONIZATION SIGNAL TRANSMISSION

CROSS REFERENCE TO RELATED APPLICATIONS

This application is a Continuation Application of U.S. application Ser. No. 16/638,004 filed Feb. 10, 2020, which is a National Stage of International Application No. PCT/CN2017/097222 filed Aug. 11, 2017, the entire contents of these applications being hereby incorporated by reference.

TECHNICAL FIELD

Embodiments of the present disclosure generally relate to the field of telecommunication, and in particular, to methods and an apparatuses for synchronization signal (SS) transmission.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, aspects related to initial access and mobility are studied for new radio access.

Conventionally, in order to access a network, a terminal device (for example, a user equipment (UE)) may detect a primary synchronization signal (PSS) and a secondary synchronization signal (SSS) in downlink (DL) signals transmitted from a surrounding network device (for example, an eNB or a gNB). Once the terminal device detects the PSS and SSS, it can obtain the physical cell identity (cell ID). Meanwhile, according to the positions of the PSS and SSS, the terminal device can determine the timing information for downlink transmission and complete the downlink synchronization.

In New Radio Access (NR), different maximum number of SS blocks within a SS burst set for different frequency ranges have been agreed. For different values of subcarrier spacing, the mapping of SS blocks to slots (such as, candidate positions for SS blocks) may be different. Demodulation reference signal (DMRS) for Physical Broadcast Channel (PBCH) as well as PBCH contents have been studied. There is Quasi-co-location (QCL) association between Channel State Information-Reference Signal (CSI-RS) and SS blocks. For different frequency ranges, the number of SS blocks actually transmitted by the network device may be different. In this case, a scheme for configuring the SS blocks actually transmitted and indicating indices thereof to the terminal device needs to be considered.

SUMMARY

In general, example embodiments of the present disclosure provide methods and apparatuses for SS transmission.

In a first aspect, there is provided a method implemented in a network device. According to the method, information on a plurality of synchronization signal (SS) blocks to be transmitted by the network device is determined based on at least one of a frequency range and a value of subcarrier spacing. The information at least in part indicates timing for transmitting the plurality of SS blocks. The plurality of SS blocks are transmitted to at least one terminal device based on the determined information.

In a second aspect, there is provided a method implemented in a terminal device. According to the method, information on a plurality of synchronization signal (SS) blocks transmitted by a network device serving the terminal device is determined based on at least one of a frequency range and a value of subcarrier spacing. The information at least in part indicates timing for transmitting the plurality of SS blocks by the network device. At least one of the plurality of SS blocks is detected based on the determined information.

In a third aspect, there is provided a network device. The network device comprises a processor and a memory coupled to the processor. The memory stores instructions that when executed by the processor, cause the network device to performs actions. The actions comprise: determining, based on at least one of a frequency range and a value of subcarrier spacing, information on a plurality of synchronization signal (SS) blocks to be transmitted by the network device, the information at least in part indicating timing for transmitting the plurality of SS blocks allocating at least one RS configuration from the plurality of RS configurations for a terminal device served by the network device, the at least one RS configuration indicating at least one RS port to be used for RS transmission; and transmitting, based on the information, the plurality of SS blocks to at least one terminal device served by the network device.

In a fourth aspect, there is provided a terminal device. The terminal device comprises a processor and a memory coupled to the processor. The memory stores instructions that when executed by the processor, cause the network device to performs actions. The actions comprise: determining, based on at least one of a frequency range and a value of subcarrier spacing, information on a plurality of SS blocks transmitted by a network device serving the terminal device, the information at least in part indicating timing for transmitting the plurality of SS blocks by the network device; and detecting, based on the information, at least one of the plurality of SS blocks.

In a fifth aspect, there is provided a computer readable medium having instructions stored thereon. The instructions, when executed on at least one processor, cause the at least one processor to carry out the method according to the first aspect.

In a sixth aspect, there is provided a computer readable medium having instructions stored thereon. The instructions, when executed on at least one processor, cause the at least one processor to carry out the method according to the second aspect.

In a seventh aspect, there is provided a computer program product that is tangibly stored on a computer readable storage medium. The computer program product includes instructions which, when executed on at least one processor, cause the at least one processor to carry out the method according to the first aspect or the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
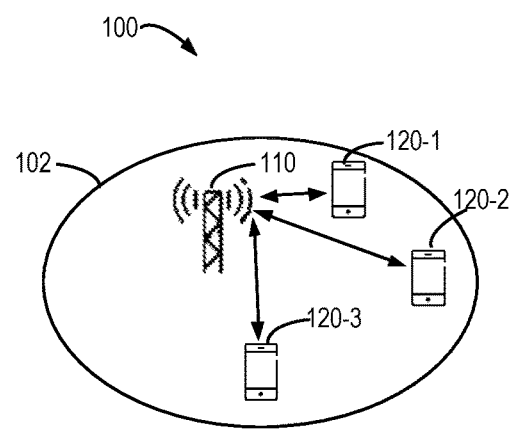
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication network 100 in which embodiments of the present disclosure can be implemented. The network 100 includes a network device 110 and three terminal devices 120-1 and 120-3 (collectively referred to as terminal devices 120 or individually referred to as terminal device 120) served by the network device 110. The coverage of the network device 110 is also called as a cell 102. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that there may be one or more neighboring cells adjacent to the cell 102 where one or more corresponding network devices provides service for a number of terminal device located therein.

The network device 110 may communicate with the terminal devices 120. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

For initial access to the network 100, the terminal device 120 may detect a primary synchronization signal (PSS) and a secondary synchronization signal (SSS) in signals transmitted in a downlink (DL) from the network device 110. As used herein, a "downlink" refers to a link from a network device to a terminal device, while an "uplink" refers to a link from the terminal device to the network device. Once the terminal device detects the PSS and SSS, it can obtain the physical cell identity (cell ID). Meanwhile, according to the determined positions of the PSS and SSS in the downlink signals, the terminal device can obtain at least part of the timing information for downlink transmission.

Figure 2A:
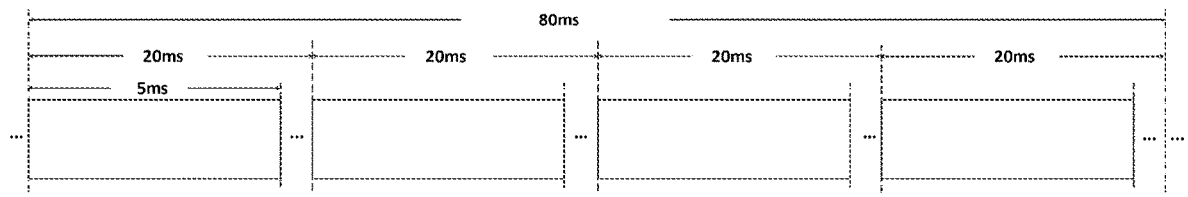
FIGS. 2A-2B show examples of some embodiments of the present disclosure.
Figure 2B:
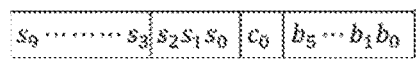

The PSS and SSS may be included in a SS block. As used herein, a "SS block" refers to a transmission unit composed of a PSS, a SSS and associated PBCH signals. For example, one SS block may contain K Orthogonal Frequency Division Multiplexing (OFDM) symbols (K is an integer and K≥4), in which one symbol is used for PSS (also referred to as "PSS symbol"), one symbol is used for SSS (also referred to as "SSS symbol") and the remaining K−2 symbols are used for PBCH (also referred to as "PBCH symbols"). Specifically, for example, one SS block may contain 4 OFDM symbols, in which the first symbol is used for PSS, the second and fourth symbols are used for PBCH and the third symbol is used for SSS. A SS burst set may include a number of SS blocks, and the SS block burst set may be repeated with a certain periodicity. For example, the periodicity may be one of {5 ms, 10 ms, 20 ms, 40 ms, 80 ms, 160 ms}. Index information associated with a SS block may need to be indicated to the terminal device to facilitate the detection of the SS block by the terminal device. Alternatively, the index information associated with a SS block may be predefined and known to both of the network device and the terminal device. The index information may indicate timing for transmitting the SS block to the terminal device. FIGS. 2A and 2B show examples of such arrangement according to some embodiments of the present disclosure.

In some embodiments, the duration of one radio frame may be 10 ms. There may be 10 sub-frames within one radio frame, and the duration of each of the 10 sub-frames may be 1 ms.

As shown in FIG. 2A, in some embodiments, the SS block burst set may be repeated in a radio frame with a periodicity of 20 ms. In one duration of 80 ms (that is, 8 radio frames), there may be at least 4 SS block burst sets, each of which may be within 5 ms. There may be 20 ms intervals between two adjacent SS burst sets. FIG. 2B shows example timing information about a SS block. As shown in FIG. 2B, the timing information may include a system frame number (SFN) represented by 10 bits, which are ($s_9$, ..., $s_3$, $s_2$, $s_1$, $s_0$). ($s_9$, ..., $s_3$) may indicate an index of duration of 80 ms as shown in FIG. 2A. ($s_2$, $s_1$, $s_0$) may indicate an index of a radio frame (with a duration of 10 ms) within the duration of 80 ms. The timing information may also include a half frame indication represent by $c_0$, which indicates the first or second 5 ms in a radio frame, for example whether the SS block burst set is located in the first or second 5 ms in the radio frame. The timing information may also include an index of the SS block within a SS block burst set represent by up to 6 bits, which are ($b_5$, ..., $b_1$, $b_0$).

As described above, in NR, a number of discussions about the initial access have been conducted and several agreements have been achieved. For example, the maximum number of SS blocks within a SS burst set for different frequency ranges may be different. For different values of subcarrier spacing (SCS), the mapping of SS blocks to slots (such as, candidate positions for SS blocks) may be different.

For different frequency ranges, the number of SS blocks actually transmitted by the network device may be different. However, at present, there is no detailed solution for configuring the SS blocks actually transmitted and indicating timing information thereof to the terminal device in NR.

In order to solve the problems above and one or more of other potential problems, a solution for SS transmission is provided in accordance with example embodiments of the present disclosure. With the solution, the timing information about SS blocks may be indicated to the terminal device in a common and less complex manner.

Figure 3:
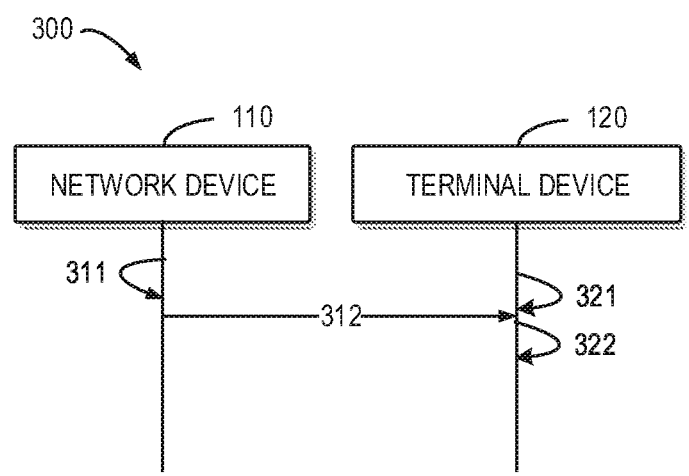
FIG. 3 shows a process for SS transmission according to some embodiments of the present disclosure.

Principle and implementations of the present disclosure will be described in detail below with reference to FIGS. 3-9, in which FIG. 3 shows a process 300 for SS transmission according to some embodiments of the present disclosure. For the purpose of discussion, the process 300 will be described with reference to FIGS. 1 and 2. The process 300 may involve the network device 110 and one or more terminal devices 120 served by the network device 110.

As shown in FIG. 3, in one embodiments, the network device 110 may determine (311), based on at least one of a frequency range and a value of subcarrier spacing, information on a plurality of SS blocks to be transmitted. In some embodiments, the information on a plurality of SS blocks may be predefined based on at least one of a frequency range and a value of subcarrier spacing. That is, for a given frequency range and/or a given value of subcarrier spacing, respective information on a plurality of SS blocks may be predefined. Then, the network device 110 may transmit (312), based on the determined information, the plurality of SS blocks to at least one terminal device 120 served by the network device 110. On the other side, the terminal device 120 may also obtain (321), in advance or in response to receiving signals from the network device 110, information on a plurality of SS blocks transmitted by the network device 110. For example, the terminal device 120 may determine the information based on at least one of a frequency range and a value of subcarrier spacing in the same way as the network device 110. Specifically, in some embodiments, the information on a plurality of SS blocks may be configured to the terminal device 120 in advance. For example, the information on a plurality of SS blocks may be predefined based on a frequency range and a subcarrier spacing value. For initial access to the network device 110, the terminal device 120 may detect (322), based on the obtained information, at least one of the plurality of SS blocks. In some embodiments, the information on a plurality of SS blocks may be predefined based on at least one of a frequency range and a value of subcarrier spacing. For initial access to the network device 110, the terminal device 120 may detect at least one of the plurality of SS blocks in a frequency range. In a given frequency range, there may be one or more corresponding subcarrier spacing values. The terminal device 120 may detect at least one of the plurality of SS blocks with one subcarrier spacing value from the corresponding subcarrier spacing values in the given frequency range. In some embodiments, the information on a plurality of SS blocks may be predefined based on the frequency range and the subcarrier spacing values for detection. The terminal device 120 may detect at least one of the plurality of SS blocks based on the predefined information.

In some embodiments, the information on a plurality of SS blocks may include at least one of the maximum number of SS blocks and the minimum number of SS blocks within a SS block burst set. For different frequency ranges, the maximum number of SS blocks within a SS block burst set may be different. For example, the maximum number of SS blocks within a SS block burst set may be represented by L. In one embodiment, for frequency range up to 3 GHz, L may be 4. In another embodiment, for frequency range from 3 GHz to 6 GHz, L may be 8. In yet another embodiment, for frequency range from 6 GHz to 52.6 GHz, L may be 64. In some embodiments, the minimum number of SS blocks within a SS block burst set may be 1 to define performance requirements.

Figure 4A:
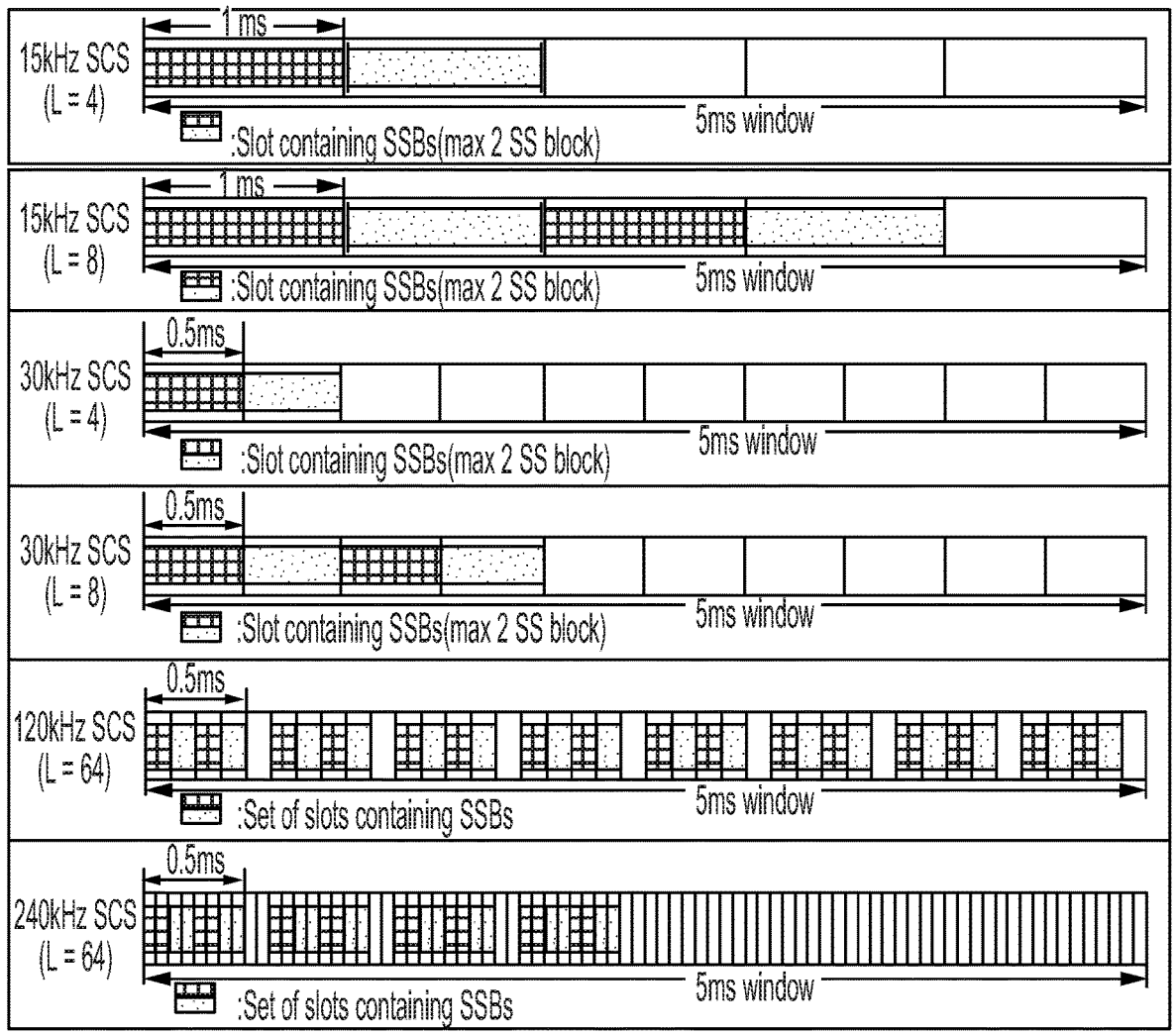
FIGS. 4A-4B shows examples of some embodiments of the present disclosure.

In some embodiments, the value of subcarrier spacing may be selected from {15 KHz, 30 KHz, 120 KHz, 240 KHz}. In some embodiments, for different frequency ranges and/or different values of subcarrier spacing, the mapping of SS blocks to slots (such as, candidate positions for SS blocks) may be different. Examples of the mapping of SS blocks to slots for different frequency ranges and different values of subcarrier spacing are shown in FIG. 4.

In some embodiments, some parameters may be defined or configured for transmission of a plurality of SS blocks. For different parameters or different values of parameters, the information on a plurality of SS blocks may be different. In some embodiments, the parameters may include at least one of a frequency range and a value of subcarrier spacing of SS block.

In some embodiments, the information on a plurality of SS blocks may include at least one of the following: respective subcarrier spacing values for the plurality of SS blocks, a payload size for PBCH, information on one or more fields in PBCH, periodicity of the plurality of SS blocks, the number of scrambling sequences for PBCH, the number of scrambling sequences for Cyclic Redundancy Check (CRC) of PBCH, the number of mask sequences for CRC of PBCH, the number of demodulation reference signal (DMRS) sequences for PBCH, mapping information on the scrambling sequences for PBCH, mapping information on the scrambling sequences for CRC of PBCH, mapping information on the mask sequences for CRC of PBCH, mapping information on the DMRS sequences for PBCH. The one or more fields in PBCH may be used to indicate a part of index information associated with a SS block. In some embodiments, the information on the one or more fields in PBCH may include at least one of the following: whether each of the one or more fields is included in PBCH; and a respective size of each of the one or more fields.

In some embodiments, the frequency may be divided into several ranges. For example, range A may represent a frequency range up to 3 GHz, range B may represent a frequency range from 3 GHz to 6 GHz, and range C may represent a frequency range above 6 GHz. In some embodiments, the value of subcarrier spacing may be selected from {15 kHz, 30 kHz, 120 kHz, 240 kHz}.

In some embodiments, for different frequency ranges, different subsets of subcarrier spacing values may be used for SS block transmission. For example, for frequency ranges A and/or B, the subcarrier spacing values may be selected from {15 kHz, 30 kHz}. For frequency range C, the subcarrier spacing values may be selected from {120 kHz, 240 kHz}.

In some embodiments, a set of periodicities may be configured for SS block transmission. For example, the set of periodicities may be {$p_0, p_1, \ldots p_{N-1}$}, where N is a positive integer and represent the number of the periodicities. In some embodiments, for a frequency ranges and/or a value of subcarrier spacing, a subset of periodicities may be available and configured for SS block transmission. For example, the number of periodicities in the subset may be M, where M is a positive integer and M≤N, and the periodicities in the subset may be selected from the set of periodicities.

In some embodiments, for different frequency ranges and/or values of subcarrier spacing, the number of periodicities in the subset may be different. In some embodiments, for different frequency ranges and/or values of subcarrier spacing, respective subsets of periodicities selected from the set of periodicities may be different. For example, the set of periodicities may be {5 ms, 10 ms, 20 ms, 40 ms, 80 ms, 160 ms}. In one embodiment, for frequency range up to 3 GHz, the periodicity may be at least one of {10 ms, 20 ms, 40 ms, 80 ms, 160 ms}. In another embodiment, for frequency range from 3 GHz to 6 GHz, the periodicity may be at least one of {10 ms, 20 ms, 40 ms, 80 ms, 160 ms}. In another embodiment, for frequency range above 6 GHz, the periodicity may be at least one of {5 ms, 10 ms, 20 ms, 40 ms, 80 ms}. In one embodiment, for subcarrier spacing 15 kHz, the periodicity may be at least one of {10 ms, 20 ms, 40 ms, 80 ms, 160 ms}. In another embodiment, for subcarrier spacing 30 kHz, the periodicity may be at least one of {10 ms, 20 ms, 40 ms, 80 ms, 160 ms}. In another embodiment, for subcarrier spacing 120 kHz, the periodicity may be at least one of {5 ms, 10 ms, 20 ms, 40 ms, 80 ms}. In another embodiment, for subcarrier spacing 240 kHz, the periodicity may be at least one of {5 ms, 10 ms, 20 ms, 40 ms, 80 ms}.

In some embodiments, one SS block may include one PSS symbol, one SSS symbol, and two or more PBCH symbols. In one embodiment, the PBCH payload in one SS block may include at least part of SFN indication. For example, the number of bits for SFN indication may be P, and the bit field for SFN indication may be represented as: ($a_{P-1}, a_{P-2}, \ldots, a_0$). For example, the number of bits for the first part of SFN indication may be (P-Q) and the bit field for the first part of SFN indication may be represented as: ($a_{P-1}, a_{P-2}, \ldots, a_Q$); the number of bits for the second part of SFN indication may be Q, and the bit field for the second part of SFN indication may be represented as: ($a_{Q-1}, a_{Q-2}, \ldots, a_0$). In addition, the number of bits for half frame indication may be 1, and the bit field for half frame indication may be represented as: ($c_0$). The number of bits for at least part of SS block index indication may be K, and the bit field for at least part of SS block index indication may be represented as: ($b_{K-1}, b_{K-2}, \ldots, b_0$). Some other system information may be included in the PBCH payload. In some embodiments, the two or more PBCH symbols may be associated with same or different DMRS sequences. For example, the number of DMRS sequences may be G, where G is a positive integer. In some embodiments, the PBCH may be scrambled with a sequence, also called as a "scrambling sequence". For example, the number of scrambling sequences for PBCH may be H, where H is a positive integer. For example, the scrambling sequence may be used to scramble the PBCH payload. For another example, the scrambling sequence may be used to scramble the CRC of PBCH. For another example, the scrambling sequence may be a CRC mask for PBCH.

In some embodiments, the number of bits for SS block index indication in PBCH payload may be different for different frequency ranges and/or values of subcarrier spacing. In one embodiment, for frequency range up to 3 GHz, the number of bits for SS block index indication in PBCH payload may be 0. In other words, there may be no field for SS block index indication in PBCH payload. In another embodiment, for frequency range from 3 GHz to 6 GHz, the number of bits for SS block index indication in PBCH payload may be 0. In other words there may be no field for SS block index indication in PBCH payload. In another embodiment, for frequency range from 3 GHz to 6 GHz, the number of bits for SS block index indication in PBCH payload may be 1. In another embodiment, for frequency range above 6 GHz, the number of bits for SS block index indication in PBCH payload may be 3 or 4. In one embodiment, for frequency range up to 3 GHz, the number of bits for half frame indication in PBCH payload may be 0. That is, there may be no field for half frame indication in PBCH payload. In another embodiment, for frequency range above 3 GHz (for example, frequency range from 3 GHz to 6 GHz or frequency range above 6 GHz), the number of bits for half frame indication in PBCH payload may be 1.

In some embodiments, a SFN with a value selected from $(0, 1, 2, \ldots 2^P-1)$ may be indicated, where P is a positive integer. In some embodiments, the SFN may be indicated by at least one of the following: at least part of SFN indication included in PBCH payload (for example, the first and/or second parts of SFN indication), an index of a scrambling sequence or sequence group for PBCH, an index of a DMRS sequence or sequence group for PBCH. In one embodiment, the full SFN indication may have totally P bits and thus totally $2^P$ values of SFN can be indicated. For example, P may equal to 10, and thus totally 1024 frames or 10240 ms can be indicated. In another embodiment, the totally P bits for SFN indication may be divided into two parts, where the upper (P−Q) bits are the first part and the lower Q bits are the second part. For example, the first part may indicate granularity of $2^Q$ frames and the second part may indicate an index of a frame within one $2^Q$ frames duration. For example, Q may equal to 3. In this case, the first part may be the upper P−3 bits, and indicate granularity of 8 frames or 80 ms. The second part may be the lower 3 bits, and indicates an index of a frame within one 8 frames or 80 ms duration. For another example, P may equal to 10, and Q may equal to 3. In this case, the first part may be the upper 7 bits, and indicates granularity of 8 frames or 80 ms. The second part is may be the lower 3 bits, and indicates an index of a frame within one 8 frames or 80 ms duration.

In some embodiments, some other information may be defined to indicate at least part of the SFN indication. In some embodiments, at least part of the SFN indication may be indicated by a DMRS sequence, a DMRS sequence group, a PBCH scrambling sequence, and/or a PBCH scrambling sequence group. In some embodiments, the total number of bits for the SFN indication included in PBCH payload may be less than P. In some embodiments, the number of bits for the first part of the SFN indication may be less than P−Q. In some embodiments, the number of bits for the second part of the SFN indication may be less than Q. Specifically, in some embodiments, the number of bits for the second part of the SFN indication may be 0. That is, there may be no second part of SFN field in PBCH payload. In some embodiments, the total number of bits for the SFN indication, the number of bits for the first part of the SFN indication, and/or the number of bits for the second part of the SFN indication included in PBCH payload may be different for different frequency range and/or values of subcarrier spacing for SS block transmission. In some embodiment, the first part of the SFN indication with P−Q bits may be the same within one $2^Q$ frames duration.

In some embodiments, for different frequency ranges and/or values of subcarrier spacing, the number of DMRS sequences for PBCH and/or the number of scrambling sequences for PBCH may be different. In one embodiment, for frequency range up to 3 GHz, the number of DMRS sequences for PBCH may be 4. In another embodiment, for frequency range from 3 GHz to 6 GHz and/or frequency range above 6 GHz, the number of DMRS sequences for PBCH may be 8. In one embodiment, for frequency range up to 3 GHz, the number of scrambling sequences for PBCH may be 4. In another embodiment, for frequency range from 3 GHz to 6 GHz and/or frequency range above 6 GHz, the number of scrambling sequences for PBCH may be 8.

Figure 4B:
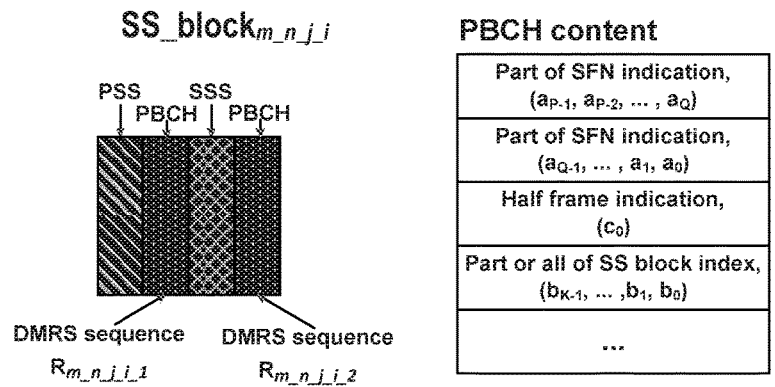

In some embodiments, as shown in FIG. 4B for example, the SS block may be represented as $SS\_block_{m\_n\_j\_i}$, where m represents an index of a period of 80 ms, n represents an index of a period of 20 ms, j represents an index of a period of 5 ms and i represents an index of SS block within 5 ms. That is, a combination of m, n, j and i consists of the index information of $SS\_block_{m\_n\_j\_i}$. For example, n may be selected from $\{0, 1, 2, 3\}$ and represent the n-th 20 ms period within 80 ms duration. For example, j may be selected from $\{0, 1, 2, 3\}$, and represents the j-th 5 ms period within 20 ms duration. For example, i may be selected from $\{0, 1, 2, 3\}$ for frequency range up to 3 GHz and/or subcarrier spacing 15 kHz or 30 kHz. Alternatively, i may be selected from $\{0, 1, 2, 3, 4, 5, 6, 7\}$ for frequency range from 3 GHz to 6 GHz and/or subcarrier spacing 15 kHz or 30 kHz. Alternatively, i may be selected from $\{0, 1, 2, \ldots, 62, 63\}$ for frequency range above 6 GHz and/or subcarrier spacing 120 kHz or 240 kHz. One example is shown in Table 1.

TABLE 1

| | 1st 80 ms | | | | | | | |
|---|---|---|---|---|---|---|---|---|
| | 1st 20 ms | | | | 2nd 20 ms | | | |
| | 1st 10 ms | | 2nd 10 ms | | 3rd 10 ms | | 4th 10 ms | |
| Within 80 ms | 1st 5 ms | 2nd 5 ms | 3rd 5 ms | 4th 5 ms | 5th 5 ms | 6th 5 ms | 7th 5 ms | 8th 5 ms |
| Half frame indication ($c_0$) | $c_{0\_0\_0\_i}$ | $c_{0\_0\_1\_i}$ | $c_{0\_0\_2\_i}$ | $c_{0\_0\_3\_i}$ | $c_{0\_1\_0\_i}$ | $c_{0\_1\_1\_i}$ | $c_{0\_1\_2\_i}$ | $c_{0\_1\_3\_i}$ |
| 1st part of SFN indication ($a_{P-1}, a_{P-2}, \ldots, a_Q$) | $a\text{-}1_{0\_0\_0\_i}$ | $a\text{-}1_{0\_0\_1\_i}$ | $a\text{-}1_{0\_0\_2\_i}$ | $a\text{-}1_{0\_0\_3\_i}$ | $a\text{-}1_{0\_1\_0\_i}$ | $a\text{-}1_{0\_1\_1\_i}$ | $a\text{-}1_{0\_1\_2\_i}$ | $a\text{-}1_{0\_1\_3\_i}$ |
| 2nd part of SFN indication | $a\text{-}2_{0\_0\_0\_i}$ | $a\text{-}2_{0\_0\_1\_i}$ | $a\text{-}2_{0\_0\_2\_i}$ | $a\text{-}2_{0\_0\_3\_i}$ | $a\text{-}2_{0\_1\_0\_i}$ | $a\text{-}2_{0\_1\_1\_i}$ | $a\text{-}2_{0\_1\_2\_i}$ | $a\text{-}2_{0\_1\_3\_i}$ |
| Scrambling sequence for PBCH | $S_{0\_0\_0\_i}$ | $S_{0\_0\_0\_i}$ | $S_{0\_0\_1\_i}$ | $S_{0\_0\_2\_i}$ | $S_{0\_0\_3\_i}$ | $S_{0\_1\_0\_i}$ | $S_{0\_1\_1\_i}$ | $S_{0\_1\_2\_i}$ |
| DMRS sequence within 5 ms | $R_{0\_0\_0\_i}$ | $R_{0\_0\_0\_i}$ | $R_{0\_0\_1\_i}$ | $R_{0\_0\_2\_i}$ | $R_{0\_0\_3\_i}$ | $R_{0\_1\_0\_i}$ | $R_{0\_1\_1\_i}$ | $R_{0\_1\_2\_i}$ |

TABLE 1-continued

| | 1st 80 ms | | | | | | | |
|---|---|---|---|---|---|---|---|---|
| | 3rd 20 ms | | | | 4th 20 ms | | | |
| | 5th 10 ms | | 6th 10 ms | | 7th 10 ms | | 8th 10 ms | |
| Within 80 ms | 9th 5 ms | 10th 5 ms | 11th 5 ms | 12th 5 ms | 13th 5 ms | 14th 5 ms | 15th 5 ms | 16th 5 ms |
| Half frame indication ($c_0$) | $c_{0\_2\_0\_i}$ | $c_{0\_2\_1\_i}$ | $c_{0\_2\_2\_i}$ | $c_{0\_2\_3\_i}$ | $c_{0\_3\_0\_i}$ | $c_{0\_3\_1\_i}$ | $c_{0\_3\_2\_i}$ | $c_{0\_3\_3\_i}$ |
| 1st part of SFN indication in PBCH | $a\text{-}1_{0\_2\_0\_i}$ | $a\text{-}1_{0\_2\_1\_i}$ | $a\text{-}1_{0\_2\_2\_i}$ | $a\text{-}1_{0\_2\_3\_i}$ | $a\text{-}1_{0\_3\_0\_i}$ | $a\text{-}1_{0\_3\_1\_i}$ | $a\text{-}1_{0\_3\_2\_i}$ | $a\text{-}1_{0\_3\_3\_i}$ |
| 2nd part of SFN indication in PBCH | $a\text{-}2_{0\_2\_0\_i}$ | $a\text{-}2_{0\_2\_1\_i}$ | $a\text{-}2_{0\_2\_2\_i}$ | $a\text{-}2_{0\_2\_3\_i}$ | $a\text{-}2_{0\_3\_0\_i}$ | $a\text{-}2_{0\_3\_1\_i}$ | $a\text{-}2_{0\_3\_2\_i}$ | $a\text{-}2_{0\_3\_3\_i}$ |
| Scrambling sequence for PBCH | $S_{0\_2\_0\_i}$ | $S_{0\_2\_1\_i}$ | $S_{0\_2\_2\_i}$ | $S_{0\_2\_3\_i}$ | $S_{0\_3\_0\_i}$ | $S_{0\_3\_1\_i}$ | $S_{0\_3\_2\_i}$ | $S_{0\_3\_3\_i}$ |
| DMRS sequence within 5 ms | $R_{0\_2\_0\_i}$ | $R_{0\_2\_1\_i}$ | $R_{0\_2\_2\_i}$ | $R_{0\_2\_3\_i}$ | $R_{0\_3\_0\_i}$ | $R_{0\_3\_1\_i}$ | $R_{0\_3\_2\_i}$ | $R_{0\_3\_3\_i}$ |

In some embodiments, for some SS blocks, the bits in PBCH payload may be the same. In some embodiments, there may be at least 4 SS blocks within one 80 ms duration. The values of i for the at least 4 SS blocks may be the same, and the time interval between the adjacent two SS blocks are 20 ms. The bits in PBCH payload may be the same for these SS blocks. For example, the PBCH payload for SS_block$_{m\_0\_j\_i}$, SS_block$_{m\_1\_j\_i}$, SS_block$_{m\_2\_j\_i}$ and SS_block$_{m\_3\_j\_i}$ (which are associated with a same value of i) may be the same. For example, the PBCH with same bits may be combined by the terminal device to achieve better detection performance.

In some embodiments, within one SS burst set or within 5 ms duration, there may be a plurality of SS blocks. The plurality of SS blocks may be associated with a set of DMRS sequences or sequence groups, which may be represented as $R_{m\_n\_j}$. Alternatively, $R_{m\_n\_j}$ may represent respective indices of the set of DMRS sequences or sequence groups, or mappings thereof to different SS blocks. In some embodiments, for each SS_block$_{m\_n\_j\_i}$ within 5 ms duration or SS burst set duration, the DMRS sequence or sequence group for SS_block$_{m\_n\_j\_i}$ may be represented as $R_{m\_n\_j\_i}$. For example, the set of DMRS sequences or sequence groups $R_{m\_n\_j}$ may include at least one DMRS sequence or sequence group $R_{m\_n\_j\_i}$. In some embodiments, the set of DMRS sequences or sequence groups $R_{m\_n\_j}$ may be the same for some different SS burst sets or 5 ms durations. In some other embodiments, the set of DMRS sequences or sequence groups $R_{m\_n\_j}$ may be different, meaning that the DMRS sequences or sequence groups are different or the mappings thereof to different SS blocks are different. For example, for different combinations of m, n, and j, the set of DMRS sequences or sequence groups $R_{m\_n\_j}$ may be the same for those SS blocks associated with a same value of i. For example, one 20 ms duration may be associated with a same set of DMRS sequences or sequence groups. That is, for a same combination of m, n and i, $R_{m\_n\_j1\_i}=R_{m\_n\_j2\_i}$, where j1≠j2. For another example, within one 80 ms duration, the DMRS sequences or sequence groups are the same for those SS blocks associated with a same value of j. That is, for a same combination of m, j and i, $R_{m\_n1\_j\_i}=R_{m\_n2\_j\_i}$, where n1≠n2. For another example, the DMRS sequences or sequence groups may be the same for the SS blocks within adjacent 80 ms durations. That is, for a same combination of n, j and i, $R_{m1\_n\_j\_i}=R_{m2\_n\_j\_i}$, where (m1 mod 2)≠(m2 mod 2).

In some embodiments, within one SS burst set or 5 ms duration, the respective DMRS sequence or sequence group for each SS block may be different. That is, for a same combination of m, n and j, $R_{m\_n\_j\_i}$ may be different for different values of i. For example, different $R_{m\_n\_j\_i}$ may indicate different sequences. Alternatively, different $R_{m\_n\_j\_i}$ may indicate different sequence combination or sequence order for the two PBCH symbols. In one embodiment, for different SS blocks, the two DMRS sequences for the two PBCH symbols are composed of two different sequences. For example, sequence group {R_A, R_B} and {R_A, R_C} are different. Alternatively or in addition, for different SS blocks, the two DMRS sequences for the two PBCH symbols are composed of the same two sequences but with a different order. For example, sequence group {R_A, R_B} and {R_B, R_A} are different. In some embodiments, within one SS burst set or 5 ms duration, the DMRS sequences or sequence groups may be different for some of the SS blocks. That is, for a same combination of m, n and j, $R_{m\_n\_j\_i}$ may be the same or different in different cases, where i may be an integer and i∈{0, 1, 2, . . . , 62, 63}. In one embodiment, for those SS blocks associated with different values of (i mod 8), the respective DMRS sequences or sequence groups may be different; while the same DMRS sequence or sequence group may be associated with those SS blocks associated with a same value of (i mod 8). Alternatively, in another embodiment, for those SS blocks associated with a same value of (i mod 8), the respective DMRS sequences or sequence groups may be different; while a same DMRS sequence or sequence group may be associated with those SS blocks associated with different values of (i mod 8). In some embodiments, the DMRS sequence group for SS_block$_{m\_n\_j\_i}$ may include two DMRS sequences, in which the first one may be represented as $R_{m\_n\_j\_i\_1}$, and the second one may be represented as $R_{m\_n\_j\_i\_2}$. In one embodiment, the two DMRS sequences may be different, that is, $R_{m\_n\_j\_i\_1}\neq R_{m\_n\_j\_i\_2}$. The two different sequences may be predefined within one given SS block, and $R_{m\_n\_j\_i}$ can be used to represent the DMRS sequence group for SS_block$_{m\_n\_j\_i}$. For example, the two DMRS sequences may be two different sequences generated from two different initial values. For another example, the two DMRS sequences for the two PBCH symbols within one SS block may be derived from one single long sequence, and the long sequence may be represented as $R_{m\_n\_j\_i}$. In another embodiment, the two DMRS sequences may be the same within one SS block, that is, $R_{m\_n\_j\_i\_1}=R_{m\_n\_j\_i\_2}$, and $R_{m\_n\_j\_i}$ can be used to represent both of them for SS_block$_{m\_n\_j\_i}$.

In some embodiments, within one SS burst set or within 5 ms duration, there may be a plurality of SS blocks. The plurality of SS blocks may be associated with a set of PBCH scrambling sequences, which may be represented as $S_{m\_n\_j}$. Alternatively, $R_{m\_n\_j}$ may represent respective indices of the set of PBCH scrambling sequences, or mappings thereof to different SS blocks. In some embodiments, for each $SS\_block_{m\_n\_j\_i}$ within 5 ms duration or SS burst set duration, the PBCH scrambling sequence for $SS\_block_{m\_n\_j\_i}$ may be represented as $S_{m\_n\_j\_i}$. For example, the set of PBCH scrambling sequences $S_{m\_n\_j}$ may include at least one PBCH scrambling sequences $S_{m\_n\_j\_i}$. In some embodiments, the set of PBCH scrambling sequences $S_{m\_n\_j}$ may be the same for some different SS burst sets or 5 ms durations. In some embodiments, the set of PBCH scrambling sequences $S_{m\_n\_j}$ may be different, meaning that the scrambling sequences are different or the mappings thereof to different SS blocks are different. For example, for different combinations of m, n, and j, the set of PBCH scrambling sequences may be the same for those SS blocks associated with a same value of i. For example, one 20 ms duration may be associated with a same set of PBCH scrambling sequences. That is, for a same combination of m, n and i, $S_{m\_n\_j1\_i}=S_{m\_n\_j2\_i}$, where j1≠j2. For another example, within one 80 ms duration, the PBCH scrambling sequences are the same for those SS blocks associated with a same value of j. That is, for a same combination of m, j and i, $S_{m\_n1\_j\_i}=S_{m\_n2\_j\_i}$, where n1≠n2. For another example, the PBCH scrambling sequences may be the same for the SS blocks with adjacent 80 ms durations. That is, for a same combination of n, j and i, $S_{m1\_n\_j\_i}=S_{m2\_n\_j\_i}$, where (m1 mod 2)≠(m2 mod 2).

In some embodiments, within one SS burst set or 5 ms duration, the respective PBCH scrambling sequence for each SS block may be the same. That is, for a same combination of m, n and j, $S_{m\_n\_j\_i}$ may be the same for different values of i. For example, different $S_{m\_n\_j\_i}$ may indicate different PBCH scrambling sequences. Alternatively, different $S_{m\_n\_j\_i}$ may indicate different scrambling sequence combination or sequences order for the two PBCH symbols are different. In one embodiment, for different SS blocks, the two PBCH scrambling sequences for the two PBCH symbols are composed of. For example, sequence group {S_A, S_B} and {S_A, S_C} are different. Alternatively or in addition, for different SS blocks, the two PBCH scrambling sequences for the two PBCH symbols are composed of the same two sequences but with a different order. For example, sequence group {S_A, S_B} and {S_B, S_A} are different. In some embodiments, within one SS burst set or 5 ms duration, the PBCH scrambling sequences may be the same for some of the SS blocks. That is, for a same combination of m, n and j, $S_{m\_n\_j\_i}$ may be the same or different in different cases, where i may be an integer and i∈{0, 1, 2, . . . , 62, 63}. In one embodiment, for those SS blocks associated with different values of (i mod 8), the respective PBCH scrambling sequences may be different; while the same PBCH scrambling sequence may be associated with those SS blocks associated with a same value of (i mod 8). Alternatively, in another embodiment, the same PBCH scrambling sequence may be associated with those SS blocks associated with different values of (i mod 8); while for those SS blocks associated with a same of (i mod 8), the respective PBCH scrambling sequences may be different. In some embodiments, the PBCH scrambling sequence(s) for $SS\_block_{m\_n\_j\_i}$ may include two PBCH scrambling sequences, in which the first one may be represented as $S_{m\_n\_j\_i\_1}$, and the second one may be represented as $S_{m\_n\_j\_i\_2}$. In one embodiment, the two PBCH scrambling sequences may be different, that is, $S_{m\_n\_j\_i\_1} \neq S_{m\_n\_j\_i\_2}$. The two different sequences may be predefined within one given SS block, and $S_{m\_n\_j\_i}$ can be used to represent the PBCH scrambling sequence group for $SS\_block_{m\_n\_j\_i}$. For example, the two PBCH scrambling sequences may be the same for one given SS block, that is, $S_{m\_n\_j\_i\_1}=S_{m\_n\_j\_i\_2}$, and $S_{m\_n\_j\_i}$ can be used to represent both of them for $SS\_block_{m\_n\_j\_i}$.

It is to be understood that the index information for a SS block represented as a combination of m, n, j and i is only for the purpose of illustration without suggesting any limitations. For example, in some other embodiments, the SS block can be indexed in different manners.

In some embodiments, within one 80 ms duration, the PBCH payload may be the same for different 20 ms durations (such as, different values of n). In some embodiments, within one 80 ms duration, for SS blocks with a same index in a SS burst set but in different 20 ms durations (that is, SS blocks associated with a same value of i and different values of n), the respective PBCH scrambling sequences may be different. In some embodiments, within one 80 ms duration, for SS blocks with a same index in a SS burst set but in different 20 ms durations, (that is, SS blocks associated with a same value of i and different values of n), the respective DMRS sequences or sequence groups for PBCH may be different. For example, at least within one 80 ms duration, at least 4 PBCHs in SS blocks with a same index in a SS burst set but in different 20 ms durations may be combined.

In some embodiments, for different frequency range and/or different values of subcarrier spacing, the information on a plurality of SS blocks may be different. The information may include at least one of the following: the bit size of the first part of SFN indication in PBCH payload, the bit size of the second part of SFN indication in PBCH payload, the bit size of half frame indication in PBCH payload, the bit size of SS block index indication in PBCH payload, whether the second part of SFN indication is existed in PBCH payload, whether the half frame indication is existed in PBCH payload and whether the SS block index indication is existed in PBCH payload.

In some embodiments, there may be a set of DMRS sequences for SS block transmission. In one embodiment, the sets of DMRS sequences may be different for different cells or TRPs. In another embodiment, the same set of DMRS sequences may be defined for different cells or TRPs. In one embodiment, there may be 8 different sequences in the set of DMRS sequences, for example, which may be represented as {R_A, R_B, R_C, R_D, R_E, R_F, R_G, R_H}. In another embodiment, there may be 4 different sequences in the set of DMRS sequences, for example, which may be represented as {R_A, R_B, R_C, R_D}.

In some embodiments, there may be a set of PBCH scrambling sequences for SS block transmission. In one embodiment, the sets of PBCH scrambling sequences may be different for different cells or TRPs. In another embodiment, the same set of PBCH scrambling sequences may be defined for different cells or TRPs. In one embodiment, there may be 8 different sequences in the set of PBCH scrambling sequences, which may be represented as {S_A, S_B, S_C, S_D, S_E, S_F, S_G, S_H}. In another embodiment, there may be 4 different sequences in the set of PBCH scrambling sequences, for example, which may be represented as {S_A, S_B, S_C, S_D}.

In some embodiments, when the subcarrier spacing is 15 kHz or 30 kHz and/or the frequency range is up to 3 GHz, the maximum number of SS block may be 4. For $SS\_block_{m\_n\_j\_i}$, i may be selected from {0, 1, 2, 3}. In one embodiment, within one 5 ms duration or one SS burst set, the 4 SS blocks may be associated with different DMRS sequences. For example, DMRS sequences for $SS\_block_{m\_n\_j\_i}$ associated with a same combination of m, n and j but different values of i may be different. For example, DMRS sequences R_A, R_B, R_C and R_D may be used for SS_block$_{m\_n\_j\_0}$, SS_block$_{m\_n\_j\_1}$, SS_block$_{m\_n\_j\_2}$, SS_block$_{m\_n\_j\_3}$ respectively. For example, when UE detects one of the 4 DMRS sequences is used for the SS block, UE can obtain the symbol index, the slot index and/or the sub-frame index within the 5 ms duration. For example, UE can determine that which 1 ms of the 5 ms duration is the SS block located. In one embodiment, within one 5 ms duration or one SS burst set, the 4 SS blocks may be associated with the same PBCH scrambling sequence. That is, the respective PBCH scrambling sequence for SS_block$_{m\_n\_j\_i}$ associated with a same combination of m, n and j but different values of i may be the same ($S_{m\_n\_j\_0}=S_{m\_n\_j\_1}=S_{m\_n\_j\_2}=S_{m\_n\_j\_3}$). In one embodiment, within one 5 ms duration or one SS burst set, the bits in PBCH payload may be the same for the 4 SS blocks.

In some embodiments, when the subcarrier spacing is 15 kHz or 30 kHz and/or the frequency range is from 3 GHz to 6 GHz, the maximum number of SS block is 8. For SS_block$_{m\_n\_j\_i}$, i may be selected from {0, 1, 2, 3, 4, 5, 6, 7}. In one embodiment, within one 5 ms duration or one SS burst set, the 8 SS blocks may be associated with different DMRS sequences. For example, DMRS sequences for SS_block$_{m\_n\_j\_i}$ associated with a same combination of m, n and j but different values of i may be different. For example, DMRS sequences R_A, R_B, R_C, R_D, R_E, R_F, R_G and R_H may be used for SS_block$_{m\_n\_j\_0}$, SS_block$_{m\_n\_j\_1}$, SS_block$_{m\_n\_j\_2}$, SS_block$_{m\_n\_j\_3}$, SS_block$_{m\_n\_j\_4}$, SS_block$_{m\_n\_j\_5}$, SS_block$_{m\_n\_j\_6}$ and SS_block$_{m\_n\_j\_7}$, respectively. For example, when UE detects one of the 8 DMRS sequences is used for the SS block, UE can obtain the symbol index, the slot index and/or the sub-frame index within the 5 ms duration. For example, UE can determine that which 1 ms of the 5 ms duration is the SS block located. In one embodiment, within one 5 ms duration or one SS burst set, the 8 SS blocks may be associated with the same PBCH scrambling sequence. That is, the respective PBCH scrambling sequence for SS_block$_{m\_n\_j\_i}$ associated with a same combination of m, n and j but different values of i may be the same. In one embodiment, within one 5 ms duration or one SS burst set, the bits in PBCH payload may be the same for the 8 SS blocks.

In some embodiments, a scrambling sequence for PBCH and/or the bit field for SS block index indication in PBCH may be used to indicate at least part of the index of a SS block within one SS burst set or one 5 ms duration. In some embodiments, the scrambling sequence for PBCH and/or the bit field for SS block index indication in PBCH used for indicating at least part of the index of a SS block within one SS burst set or one 5 ms duration may only be defined in case that the frequency range is above 6 GHz, or the maximum number of SS blocks within one SS burst set or one 5 ms duration is 64. In some embodiments, the scrambling sequence for PBCH and/or the bit field for SS block index indication in PBCH used for indicating at least part of the index of a SS block within one SS burst set or one 5 ms duration may only be defined in case that the frequency range is above 3 GHz, or the maximum number of SS blocks within one SS burst set or one 5 ms duration is 8 or 64.

In some embodiments, when the subcarrier spacing is 15 kHz or 30 kHz and/or the frequency range is from 3 GHz to 6 GHz, the maximum number of SS block is 8. For SS_block$_{m\_n\_j\_i}$, i may be selected from {0, 1, 2, 3, 4, 5, 6, 7}. In some embodiments, within 5 ms or one SS burst set, 4 of the 8 SS blocks may be associated with different DMRS sequences. In one embodiment, within one SS burst set or one 5 ms duration, DMRS sequence for SS_block$_{m\_n\_j\_i}$ associated with different values of (i mod 4) may be different. For example, DMRS sequence R_A may be used for the SS block with (i mod 4)=0; DMRS sequence R_B may be used for SS blocks with (i mod 4)=1; DMRS sequence R_C may be used for the SS block with (i mod 4)=2; and DMRS sequence R_D may be used for the SS block with (i mod 4)=3. In one embodiment, there may be a field with the size of 1 bit in PBCH payload to indicate part of the SS block index for those SS blocks associated with the same value of (i mod 4) but different values of i. For example, the 1 bit may be used to differentiate two SS blocks with index 0 and index 4, to differentiate two SS blocks with index 1 and index 5, to differentiate two SS blocks with index 2 and index 6, and to differentiate two SS blocks with index 3 and index 7. In another embodiment, DMRS sequence R_A may be used for SS blocks with index 0 or 1; DMRS sequence R_B may be used for the SS blocks with index i=2 or 3; DMRS sequence R_C may be used for SS blocks with index i=4 or 5; and DMRS sequence R_D may be used for the SS blocks with index i=6 or 7. In one embodiment, there may be a field with the size of 1 bit in PBCH payload to indicate part of the SS block index for those SS blocks associated with different values of (i mod 2). For example, the 1 bit may be used to differentiate two SS blocks with index 0 and index 1, to differentiate two SS blocks with index 2 and index 3, to differentiate two SS blocks with index 4 and index 5, and to differentiate two SS blocks with index 6 and index 7. In some embodiments, the total indication of SS block index may be obtained from both the DMRS sequence and the 1 bit in PBCH payload. For example, when UE detects the DMRS sequence that is used for the SS block, UE can obtain the symbol index, the slot index and/or the sub-frame index within the 5 ms duration. For example, UE can determine that which 1 ms of the 5 ms duration is the SS block located. In one embodiment, within one 5 ms duration or one SS burst set, the 8 SS blocks may be associated with the same PBCH scrambling sequence. For example, for a same combination of m, n and j but different values of different values of i, the respective PBCH scrambling sequences may be the same. In one embodiment, within one 5 ms duration or one SS burst set, 4 of the 8 SS blocks may be associated with one PBCH scrambling sequence, and the other 4 of the 8 SS blocks may be associated with another PBCH scrambling sequence. For example, there may be at least 2 different scrambling sequences for PBCH, one of which may be defined for SS blocks with index i=0, 1, 2 or 3, while the other of which may be defined for SS blocks with index i=4, 5, 6 or 7. For another example, there may be at least 2 different scrambling sequences for PBCH, one of which may be defined for SS blocks with index i=0, 2, 4 or 6, while the other of which may be defined for SS blocks with index i=1, 3, 5 or 7. For example, the total indication of SS block index may be obtained from both the DMRS sequence and the 1 bit in PBCH payload. In one embodiment, within one 5 ms duration or one SS burst set, the bits in the PBCH payload may be the same for the 8 SS blocks.

In some embodiments, when the subcarrier spacing is 120 kHz or 240 kHz and/or the frequency range is above 6 GHz, the maximum number of SS block is 64. For example, for SS_block$_{m\_n\_j\_i}$, i may be an integer and i$\in$ {0, 1, 2, 3, . . . , 62, 63}. In some embodiments, within one SS burst set or one 5 ms duration, the respective DMRS sequence or sequence group for each of the 64 SS blocks may be different. For example, for a same combination of m, n and j, R$_{m\_n\_j\_i}$ may be different for some of the values of i. In some embodiments, there may be 8 different DMRS sequences, for example represented as {R_A, R_B, R_C, R_D, R_E, R_F, R_G, R_H}. The respective combinations of two DMRS sequences for the two PBCH symbols ($R_{m\_n\_j\_i\_1}$, $R_{m\_n\_j\_i\_2}$) for different SS blocks may be different. For example, for different SS blocks, at least one of $R_{m\_n\_j\_i\_1}$ and $R_{m\_n\_j\_i\_2}$ may be different. For example, there may be 64 different combinations of two DMRS sequences, which may be used to indicate the 64 SS block indices within one SS burst set or one 5 ms duration. In one embodiment, there may be no bit field for SS block index indication in PBCH payload for indicating part of the SS block index within one SS burst set or one 5 ms duration.

In some embodiments, when the subcarrier spacing is 120 kHz or 240 kHz and/or the frequency range is above 6 GHz, the maximum number of SS block is 64. For example, for SS_block$_{m\_n\_j\_i}$, i may be an integer and i∈{0, 1, 2, 3, . . . , 62, 63}. In some embodiments, within one SS burst set or one 5 ms duration, the respective DMRS sequences or sequence groups may be different for some of the 64 SS blocks. For example, for a same combination of m, n and j, $R_{m\_n\_j\_i}$ may be different for some of the values of i. In some embodiments, within one SS burst set or one 5 ms duration, the maximum 64 SS blocks may be divided into 8 groups, each of which may include 8 SS blocks. For example, the number of DMRS sequences within one SS burst set or one 5 ms duration may be 8. The respective DMRS sequences or sequence groups for different SS block groups may be different. However, the DMRS sequences or sequence groups for the 8 SS blocks within one SS block group may be the same. For example, the maximum 64 SS blocks indexed with 0, 1, 2, 3, . . . , 62 and 63 may be divided into 8 groups, each with respective indices as following: {0, 1, 2, 3, 4, 5, 6, 7}, {8, 9, 10, 11, 12, 13, 14, 15}, {16, 17, 18, 19, 20, 21, 22, 23}, {24, 25, 26, 27, 28, 29, 30, 31}, {32, 33, 34, 35, 36, 37, 38, 39}, {40, 41, 42, 43, 44, 45, 46, 47}, {48, 49, 50, 51, 52, 53, 54, 55} and {56, 57, 58, 59, 60, 61, 62, 63}. Alternatively, the maximum 64 SS blocks indexed with 0, 1, 2, 3, . . . , 62 and 63 may be divided into 8 groups, each with respective indices as following: {0, 2, 4, 6, 8, 12, 14}, {1, 3, 5, 7, 9, 11, 13, 15}, {16, 18, 20, 22, 24, 26, 28, 30}, {17, 19, 21, 23, 25, 27, 29, 31}, {32, 34, 36, 38, 40, 42, 44, 46}, {33, 35, 37, 39, 41, 43, 45, 47}, {48, 50, 52, 54, 56, 58, 60, 62} and {49, 51, 53, 55, 57, 59, 61, 63}. In one embodiment, within one SS burst set or one 5 ms duration, the DMRS sequences or sequence groups associated with different values of (i mod 8) may be different, and the DMRS sequences or sequence groups associated with a same value of (i mod 8) may be the same. In another embodiment, i may be an integer and i∈{0, 1, 2, 3, . . . , 62, 63}. The DMRS sequences or sequence groups associated with different values of (i mod 8) may be the same, and the DMRS sequences or sequence groups associated with a same value of (i mod 8) may be different. In some embodiments, the indices of the maximum 64 SS blocks may need 6 bits to be indicated, in which 3 bits can be indicated by the 8 different DMRS sequences or sequence groups, and the remaining 3 bits may be indicated by at least one of the following: more DMRS sequences which are different from each other, part of the bit field for SS block indication in PBCH payload, and different PBCH scrambling sequences. In one embodiment, there may be a field with the size of 3 bits in PBCH payload to indicate part of the SS block index. For example, the 3 bits may be used to differentiate those SS blocks associated with the same DMRS sequence or sequence group. In another embodiment, for those SS blocks associated with the same DMRS sequence or sequence group, the respective PBCH scrambling sequences may be different. In this case, the remaining 3 bits for SS block index indication may be indicated by different PBCH scrambling sequences. For example, within one SS burst set or one 5 ms duration, there may be at least 8 different PBCH scrambling sequences. In another embodiment, the remaining 3 bits may be indicated by combinations of the bit field for SS block index indication in PBCH and the scrambling sequence for PBCH. For example, the number of bits for SS block index indication in PBCH may be 2. In addition, within one SS burst set or one 5 ms duration, there may be at least 2 different scrambling sequences for PBCH. Alternatively, the number of bits for SS block index indication in PBCH may be 1. In addition, within one SS burst set or one 5 ms duration, there may be at least 4 different scrambling sequences for PBCH.

In some embodiments, when the subcarrier spacing is 120 kHz or 240 kHz and/or the frequency range is above 6 GHz, the maximum number of SS block is 64. For example, for SS_block$_{m\_n\_j\_i}$, i may be an integer and i∈{0, 1, 2, 3, . . . , 62, 63}. In some embodiments, within one SS burst set or one 5 ms duration, the respective DMRS sequences or sequence groups may be different for some of the 64 SS blocks. For example, for a same combination of m, n and j, $R_{m\_n\_j\_i}$ may be different for some of the values of i. In some embodiments, within one SS burst set or one 5 ms duration, the maximum 64 SS blocks may be divided into 4 groups, each of which may include 16 SS blocks. The respective DMRS sequences or sequence groups for different SS block groups may be different. However, the DMRS sequences or sequence groups for the 16 SS blocks within one SS block group may be the same. For example, the number of DMRS sequences within one SS burst set or one 5 ms duration may be 4. In some embodiments, the indices of the maximum 64 SS blocks may need 6 bits to be indicated, in which 2 bits can be indicated by the 4 different DMRS sequences or sequence groups, and the remaining 4 bits may be indicated by at least one of the following: more DMRS sequences which are different from each other, part of the bit field for SS block indication in PBCH payload, and different PBCH scrambling sequences. In one embodiment, there may be a field with the size of 4 bits in PBCH payload to indicate part of the SS block index. For example, the 4 bits may be used to differentiate those SS blocks associated with the same DMRS sequence or sequence group. In another embodiment, for those SS blocks associated with the same DMRS sequence or sequence group, the respective PBCH scrambling sequences may be different. In this case, the remaining 4 bits may be indicated by different PBCH scrambling sequences. For example, within one SS burst set or one 5 ms duration, there may be at least 16 different PBCH scrambling sequences. In another embodiment, the remaining 4 bits may be indicated by combinations of the bit field for SS block index indication in PBCH and the scrambling sequence for PBCH. For example, the number of bits for SS block index indication in PBCH may be 3. In addition, within one SS burst set or one 5 ms duration, there may be at least 2 different scrambling sequences for PBCH. Alternatively, the number of bits for SS block indication field in PBCH may be 2. In addition, within one SS burst set or one 5 ms duration, there may be at least 4 different scrambling sequences for PBCH. Alternatively, the number of bits for SS block index indication in PBCH may be 1. In addition, within one SS burst set or one 5 ms duration, there may be at least 8 different scrambling sequences for PBCH.

In some embodiments, the DMRS sequences or sequence groups for SS blocks with a same index i in different SS burst sets or 5 ms durations may be the same. For example, for SS blocks associated with different combinations of m, n and j, and a same value of i, the DMRS sequences or sequence groups may be the same. For example, for different combinations of m, n and j, DMRS sequences $R_{m\_n\_j\_0}$ for $SS\_block_{m\_n\_j\_0}$ may be the same; DMRS sequences $R_{m\_n\_j\_1}$ for $SS\_block_{m\_n\_j\_1}$ may be the same; DMRS sequences $R_{m\_n\_j\_2}$ for $SS\_block_{m\_n\_j\_2}$ may be the same; and DMRS sequences $R_{m\_n\_j\_3}$ for $SS\_block_{m\_n\_j\_3}$ may be the same. In other words, in different 5 ms durations or SS burst sets, the set of DMRS sequences or sequence groups may be the same. In some embodiments, the first part of SFN indication with P-Q bits may be the same within one 80 ms duration. In some embodiments, the second part of SFN indication with 3 bits for SS blocks in different frames or 10 ms durations may be different. In this case, the scrambling sequences for PBCH may be the same within the duration of 80 ms, or there may be no scrambling for PBCH or the scramble sequence is fixed for all of the SS blocks. For example, $S_{m\_n\_j\_i}$ may be the same for different combinations of m, n, j and i. In some embodiments, the half frame indication may be different for different 5 ms durations within one frame or one 10 ms duration. For example, $c_{m\_n\_j\_i}=0$ if (j mod 2)=0; and $c_{m\_n\_j\_i}=1$ if (j mod 2)=1. For example, UE can obtain at least one of the symbol index, the slot index, the sub-frame index and the frame index of a SS block from a combination of the first part of SFN indication, the second part of SFN indication, the half frame indication and the DMRS sequence index.

In some embodiments, a scrambling sequence for PBCH and/or a DMRS sequence or sequence group for PBCH may be used to indicate at least part of the SFN and/or half frame indication. In some embodiments, the DMRS sequence or sequence group for indicating at least part of the SFN and/or half frame indication may only be defined in case that the frequency range is up to 3 GHz, or in case that the maximum number of SS blocks within one SS burst set or one 5 ms duration is 4.

In some embodiments, within one frame or one 10 ms duration, at least the respective scrambling sequences for PBCH may be different for SS blocks associated with different values of j. For example, $S_{m\_n\_0\_i} \neq S_{m\_n\_1\_i}$ and $S_{m\_n\_2\_i} \neq S_{m\_n\_3\_i}$. Within one frame or one 10 ms duration, at least 2 different scrambling sequences may be defined for indication of different 5 ms durations. In other words, the at least two different scrambling sequences can be used to indicate first or second half of 5 ms within one frame or one 10 ms duration. In one embodiment, the number of bits for half frame indication may be reduced. For example, the number of bits of half frame indication may be 0. That is, there may be no need to include the bit field for half frame indication in PBCH. In one embodiment, within one frame or 10 ms duration, at least the bits in PBCH payload in the two different SS burst sets or two 5 ms durations may be the same for a same value of i. For example, the bits in PBCH payload for $SS\_block_{m\_n\_0\_i}$ may be the same as that for $SS\_block_{m\_n\_1\_i}$ the bits in PBCH payload for $SS\_block_{m\_n\_2\_i}$ may be the same as that for $SS\_block_{m\_n\_3\_i}$.

In some embodiments, for SS blocks in different durations of 20 ms within one 80 ms duration, at least the respective scrambling sequences for PBCH may be different. For example, for different values of n, where $n \in \{0, 1, 2, 3\}$, the scrambling sequences may be different. That is, $S_{m\_0\_j\_i} \neq S_{m\_1\_j\_i} \neq S_{m\_2\_j\_i} \neq S_{m\_3\_j\_i}$. For example, at least 4 different scrambling sequences may be defined to differentiate different durations of 20 ms within one 80 ms duration. For example, the scrambling sequences S_A, S_B, S_C and S_D may be used for different values of n, respectively. In one embodiment, the number of bits for SFN indication and/or the second part of SFN indication in PBCH payload may be reduced. For example, the SFN may be represented as $(a_{P-1}, a_{P-2}, \ldots, a_2, a_1, a_0)$, in which the bits for $a_2$ and $a_1$ may be omitted. That is, the total number of bits for SFN indication in PBCH payload may be P-2. For another example, the number of bits for the second part of SFN indication may be 1, and the 1 bit may be used to differentiate the first frame (the first 10 ms duration) and the second frame (the second 10 ms duration) within one 20 ms duration. For example, $a-1_{m\_n\_0\_i}=a-1_{m\_n\_1\_i}=0$ and $a-1_{m\_n\_2\_i}=a-1_{m\_n\_3\_i}=1$. In one embodiment, at least for SS blocks associated with different values of n within one 80 ms duration, the bits in PBCH payload in the SS blocks may be the same. For example, the bits in PBCH payload for $SS\_block_{m\_0\_j\_i}$ may be the same as that for $SS\_block_{m\_1\_j\_i}$, $SS\_block_{m\_2\_j\_i}$ and $SS\_block_{m\_3\_j\_i}$.

In some embodiments, for SS blocks in different durations of 10 ms within one 80 ms duration, at least the respective scrambling sequences for PBCH may be different. For example, $S_{m\_0\_j\_i} \neq S_{m\_1\_j\_i} \neq S_{m\_2\_j\_i} \neq S_{m\_3\_j\_i}$, $S_{m\_n\_0\_i} \neq S_{m\_n\_2\_i}$ and $S_{m\_n\_2\_i} \neq S_{m\_n\_3\_i}$. For example, at least 8 different scrambling sequences may be defined. The 8 different scrambling sequences may be defined to differentiate different durations of 10 ms within one 80 ms duration. In one embodiment, the number of bits for SFN indication and/or the second part of SFN indication in PBCH payload may be reduced. For example, the SFN may be represented as $(a_{P-1}, a_{P-2}, \ldots, a_2, a_1, a_0)$, in which the bit for $a_2$, $a_1$ and $a_0$ may be omitted. That is, the total number of bits for SFN indication in PBCH payload may be P-3. For another example, the number of bits for the second part of SFN indication in PBCH payload may be 0. That is, there may be no need to include the bit field for the second part of SFN indication in PBCH payload.

In some embodiments, for SS blocks in adjacent 80 ms durations, at least the scrambling sequences for PBCH may be different. For example, $S_{m1\_n\_j\_i} \neq S_{m2\_n\_j\_i}$ if (m1 mod 2)≠(m2 mod 2). For example, at least 2 different scrambling sequences may be defined for the SS blocks within two adjacent 80 ms durations. The 2 different scrambling sequences may be defined to differentiate the two adjacent 80 ms durations. In one embodiment, the number of bits for SFN indication and/or the first part of SFN indication in PBCH payload may be reduced. For example, the SFN may be represented as $(a_{P-1}, a_{P-2}, \ldots, a_4, a_3, a_2, a_1, a_0)$, in which the bit for $a_3$ may be omitted. That is, the total number of bits for SFN indication in PBCH payload may be P-1. For another example, the number of bits for the first part of SFN indication in PBCH payload may be P-Q-1.

In some embodiments, for SS blocks in adjacent 80 ms durations, at least the DMRS sequences or sequence groups for PBCH may be different. For example, $R_{m1\_n\_j\_i} \neq R_{m2\_n\_j\_i}$ if (m1 mod 2)≠(m2 mod 2). For example, at least 2 different DMRS sequences may be defined for the SS blocks within two adjacent 80 ms durations. The 2 different DMRS sequences may be defined to differentiate the two adjacent 80 ms durations. For another example, totally 8 different DMRS sequences may be defined for SS block transmission, in which 4 of the 8 DMRS sequences may be defined for one of the two adjacent 80 ms durations, and the other 4 of the 8 DMRS sequences may be defined for the other one of the two adjacent 80 ms durations. In one embodiment, the number of bits for SFN indication and/or the first part of SFN indication in PBCH payload may be reduced. For example, the SFN may be represented as $(a_{P-1}, a_{P-2}, \ldots, a_4, a_3, a_2, a_1, a_0)$, in which the bit for $a_3$ may be omitted. That is, the total number of bits for SFN indication in PBCH payload may be P−1. For another example, the number of bits for the first part of SFN indication in PBCH payload may be P−Q−1.

In some embodiments, for SS blocks in different durations of 5 ms within one frame or one 10 ms duration, at least the DMRS sequences or sequence groups for PBCH may be different. For example, $R_{m\_n\_0\_i} \neq R_{m\_n\_1\_i}$ and $R_{m\_n\_2\_i} \neq R_{m\_n\_3\_i}$. For example, 2 different DMRS sequences may be defined for indication of different 5 ms durations. In other words, the two different DMRS sequences can be used to differentiate the first and second 5 ms durations within one frame or 10 ms duration. For another example, totally 8 different DMRS sequences may be defined for SS block transmission, in which 4 of the 8 DMRS sequences may be defined for the first 5 ms duration within one frame or one 10 ms duration, and the other 4 of the 8 DMRS sequences may be defined for the second 5 ms duration within one frame or one 10 ms duration. Within one frame or one 10 ms duration, the 2 different DMRS sequences or sequence groups may be defined for indication of different 5 ms durations. In other words, the two different DMRS sequences or sequence groups can be used to differentiate the first and second 5 ms durations within one frame or 10 ms duration. In one embodiment, the number of bits for half frame indication in PBCH payload may be reduced. For example, the number of bits for half frame indication may be 0. That is, there may be no need to include the bit field for half frame indication in PBCH payload. In one embodiment, within one frame or one 10 ms duration, at least the bits in PBCH payload in the two different SS burst sets or two 5 ms durations may be the same for a same value of i. For example, the bits in PBCH payload for $SS\_block_{m\_n\_0\_i}$ may be the same as that for $SS\_block_{m\_n\_1\_i}$, and the bits in PBCH payload for $SS\_block_{m\_n\_2\_i}$ may be the same as that for $SS\_block_{m\_n\_3\_i}$.

In some embodiments, for SS blocks in different durations of 20 ms within one 80 ms duration, at least the DMRS sequences for PBCH may be different. For example, for different values of n, where n∈{0, 1, 2, 3}, the DMRS sequences may be different. That is, $R_{m\_0\_j\_i} \neq R_{m\_1\_j\_i} \neq R_{m\_2\_j\_i} \neq R_{m\_3\_j\_i}$. For example, at least 4 different scrambling sequences S_A, S_B, S_C and S_D may be used for different values of n, respectively. In one embodiment, the number of bits for SFN indication and/or the second part of SFN indication in PBCH payload may be reduced. For example, the SFN may be represented as $(a_{P-1}, a_{P-2}, \ldots, a_2, a_1, a_0)$, in which the bits for $a_2$ and $a_1$ may be omitted. That is, the total number of bits for SFN indication in PBCH payload may be P−2. For another example, the number of bits for the second part of SFN indication in PBCH payload may be 1, and the 1 bit may be used to differentiate the first frame (the first 10 ms duration) and the second frame (the second 10 ms duration) within one 20 ms duration. For example, $a\text{-}1_{m\_n\_0\_i} = a\text{-}1_{m\_n\_1\_i} = 0$ and $a\text{-}1_{m\_n\_2\_i} = a\text{-}1_{m\_n\_3\_i} = 1$. In one embodiment, at least for SS blocks associated with different values of n within one 80 ms duration, the bits in PBCH payload in the SS blocks may be the same. For example, the bits in PBCH payload for $SS\_block_{m\_0\_j\_i}$ may be the same as that for $SS\_block_{m\_1\_j\_i}$, $SS\_block_{m\_2\_j\_i}$ and $SS\_block_{m\_3\_j\_i}$.

In some embodiments, for SS blocks in different durations of 10 ms within one 80 ms duration, at least the respective DMRS sequences for PBCH may be different. For example, $R_{m\_0\_j\_i} \neq R_{m\_1\_j\_i} \neq R_{m\_2\_j\_i} \neq R_{m\_3\_j\_i}$, $R_{m\_n\_0\_i} \neq R_{m\_n\_2\_i}$ and $R_{m\_n\_1\_i} \neq R_{m\_n\_3\_i}$. For example, at least 8 different DMRS sequences may be defined. The 8 different DMRS sequences may be defined to differentiate different durations of 10 ms within one 80 ms duration. In one embodiment, the number of bits for SFN indication and/or the second part of SFN indication in PBCH payload may be reduced. For example, the SFN may be represented as $(a_{P-1}, a_{P-2}, \ldots, a_2, a_1, a_0)$, in which the bits for $a_2$, $a_1$ and $a_0$ may be omitted. That is, the total number of bits for SFN indication in PBCH payload may be P−3. For another example, the number of bits for the second part of SFN indication in PBCH payload may be 0. That is, there may be no need to include the bit field for the second part of SFN indication in PBCH payload.

In some embodiments, the index information associated with a SS block may include at least one of a system frame number (SFN), a sub-frame index, a slot index, a symbol index and a SS block index within a SS burst set. In some embodiments, the one or more fields in PBCH may be used to indicate at least part of the index information associated with a SS block. In this case, the determined information on the one or more fields in PBCH may include a respective size for indicating a SFN, a respective size for indicating a slot index, a respective size for indicating a SS burst set index and/or a respective size for indicating a SS block index within a SS burst set. In some other embodiments, there may be no field in PBCH to indicate the index information associated with a SS block. For example, in some cases, there may be no field in PBCH for indicating a SS block index within a SS block burst and/or half frame timing and so on. In one embodiment, in case that the value of subcarrier spacing is 120 KHz or 240 KHz, there may be no field for indicating a SS block index within a SS block burst in PBCH payload.

That is, for different frequency ranges and/or different values of subcarrier spacing, the index information associated with a SS block may be indicated to the terminal device in different ways.

In some embodiments, a DMRS sequence for PBCH associated with a SS block may be determined based on the index information on the SS block. For example, a DMRS sequence may be defined based on a gold sequence, and the gold sequence generator may be initialized with an initial value c_init. In some embodiments, the initial value c_init may be determined based on at least one of the following parameters: a slot index $n_S$, a symbol index 1, the cell ID $N^{ID}$, a SS block index $n_{SS}$, a subcarrier spacing index $n_{SCS}$ and so on. For example, the initial value c_init may be calculated as: $c\_init = a_0 \cdot n_S + a_1 \cdot 1 + a_2 \cdot N^{ID} + a_3 \cdot n_{SS} + a_4 \cdot n_{SCS} + \ldots$, where $a_i (i \leq 0)$ represents a respective coefficient associated with each parameter. If $a_i = 0$, this means the respective parameter may not be considered in the calculation of the initial value c_init. It should be understood that, other parameters beside those as shown in above can be considered in the calculation of the initial value c_init In one embodiment, the subcarrier spacing index $n_{SCS}$ may be selected from 4 index values ($n_{SCS\_0}$, $n_{SCS\_1}$, $n_{SCS\_2}$, $n_{SCS\_3}$) corresponding to {15 KHz, 30 KHz, 120 KHz, 240 KHz} respectively.

In one embodiment, for one SS block, there may be two symbols for PBCH. In this case, there may be two DMRS sequences for the two symbols. In such embodiment, there may be two values of the symbol index 1 corresponding to the two DMRS sequences for the two symbols. For example, the symbol index 1 may be selected from (0, 1).

Figure 5A:
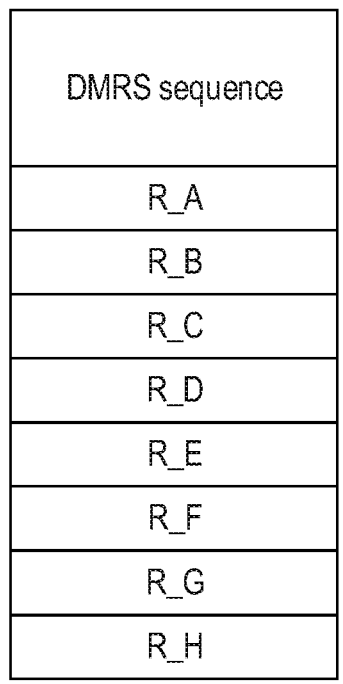
FIGS. 5A-5B show examples of some embodiments of the present disclosure.
Figure 5B:
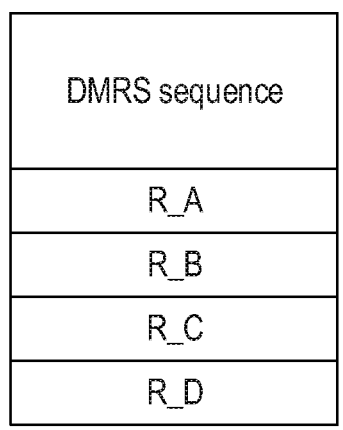

In one embodiment, 2 or 3 bits of the index of a SS block within a SS block burst set ($b_5, \ldots, b_1, b_0$) may be carried by the DMRS sequence associated with the SS block. That is, different DMRS sequences may indicate different values of the 2 or 3 bits of the index ($b_5, \ldots, b_1, b_0$). In this case, there may be 4 or 8 values of the SS block index $n_{SS}$ corresponding to the number of bits of the index of a SS block within a SS block burst set carried by the DMRS sequence. For example, as shown in FIG. 5A, if 3 bits of the index ($b_5, \ldots, b_1, b_0$) are carried by the DMRS sequence, there may be 8 values of the SS block index $n_{SS}$ for calculating the initial value c_init, and thus there may be 8 DMRS sequences corresponding to the 8 values respectively. For another example, as shown in FIG. 5B, if 2 bits of the index ($b_5, \ldots, b_1, b_0$) are carried by the DMRS sequence, there may be 4 values of the SS block index $n_{SS}$ for calculating the initial value c_init, and thus there may be 4 DMRS sequences corresponding to the 8 values respectively.

In some embodiments, the number of SS blocks actually transmitted within a SS block burst set may be less than the maximum number of SS blocks. For example, the number of SS blocks actually transmitted within a SS block burst set may be represented by N and the maximum number of SS blocks within a SS block burst set may be represented by L. In some embodiments, N≤L, and the N SS blocks actually transmitted may be included in the maximum L SS blocks with same indexing. In one embodiment, for a given frequency range and/or a given value of subcarrier spacing, the SS block information may be fixed to a given pattern according to the pattern for the maximum number of SS blocks. The given pattern may relate to the mapping of the N SS blocks into symbols, slots, sub-frames, frames, half frames and/or so on. The SS block information may be indicated by at least one of a DMRS sequence for PBCH, a scrambling sequence for PBCH and respective bit fields in PBCH payload.

In some embodiments, the number of possible DMRS sequences or sequence groups (for example, represented by K) may equal to the maximum number of SS blocks, that is K=L. In this case, for a SS block with an index of i (i=0, 1, ..., L−1), the corresponding DMRS sequence may be fixed, for example represent by R_i. In some embodiments, the number of possible DMRS sequences may not equal to the maximum number of SS blocks, that is K≠L. In this case, the K DMRS sequences may be evenly associated with the maximum L SS blocks. For example, for a SS block with an index of i (i=0, 1, ..., L−1), the corresponding DMRS sequence may be R_j (j=0, 1, ..., K−1).

In some embodiments, if the number of SS blocks actually transmitted is less than the maximum number of SS blocks, that is N≤L, a respective DMRS sequence or sequence group corresponding to one of the N SS blocks actually transmitted may be determined based on the position or index of the one of the N SS blocks actually transmitted. That is, the respective DMRS sequence or sequence group may be fixed for each position or index of the SS block.

As described above, in some embodiments, for one SS block, there may be two symbols for PBCH and thus there may be two DMRS sequences (for example, first and second DMRS sequences) for the two symbols. For example, at least one of the two DMRS sequences may be used for indication of at least part of the index of a SS block. In one embodiment, the first DMRS sequence may be the same as the second DMRS sequence. In another embodiment, the first and second DMRS sequences may be different, such as based on different initial values, different cycle shift values applied to a same base sequence, and so on. In one embodiment, one of the two DMRS sequences (for example, the first DMRS sequence) may be used for indication of at least part of the index of a SS block, while the other one may be cyclic shift of the first DMRS sequence. In another embodiment, one of the two DMRS sequences (for example, the first DMRS sequence) may be used for indication of at least part of the index of a SS block, while the other one (for example, the second DMRS sequence) may be a different sequence from the first DMRS sequence. For example, for different SS blocks, respective first DMRS sequences may be alternated to indicated different indices of SS blocks, while respective second DMRS sequences may be the same in the different SS blocks but different from the respective first sequences. In some embodiments, the relationship between the two sequences may be used to indicate the index of a SS block. For example, a combination of the two sequences, such as a combination of the two indices of the two sequences or a combination of cyclic shift values of the two sequences, may be used to indicate the index of a SS block.

More detailed examples will be shown with reference to FIGS. 6A-6H in the following, which show examples of the mapping of SS blocks to slots in case that the value of subcarrier spacing is 15 KHz and the maximum number of SS blocks within a SS block burst set is 4 according to some embodiments of the present disclosure.

In some embodiments, 2 bits of the index of a SS block within a SS block burst set ($b_5, \ldots, b_1, b_0$) may be carried by the DMRS sequence associated with the SS block. In another embodiment, if 2 bits of the index are carried by the DMRS sequence, there may be 4 values of the SS block index $n_{SS}$ for calculating the initial value c_init, and thus there may be 4 DMRS sequences corresponding to the 4 values respectively. In this case, all of the 4 sequences may be used as DMRS sequences for PBCH. FIGS. 6A-6E show example of such embodiments. FIGS. 6A-6E each show a SS block burst set within a 5 ms window, in which each element may represent a symbol and a unit of 14 symbols may represent 1 ms. In the following description, suppose that the maximum 4 SS blocks are indexed with 0, 1, 2 and 3 respectively, and the 4 DMRS sequences for PBCH are index withed R_A, R_B, R_C and R_D respectively.

In some embodiments, a respective DMRS sequence may be fixed for each position or index of the SS block. For example, the DMRS sequence R_A may be fixed to be used for the SS block 0; the DMRS sequence R_B may be fixed to be used for the SS block 1; the DMRS sequence R_C may be fixed to be used for the SS block 2; and the DMRS sequence R_D may be fixed to be used for the SS block 3. In this case, the index of a SS block within a SS block burst set ($b_5, \ldots, b_1, b_0$) are only carried by the DMRS sequence associated with the SS block. Thus, there may be no field for indicating a SS block index within a SS block burst in PBCH payload.

Figure 6A:
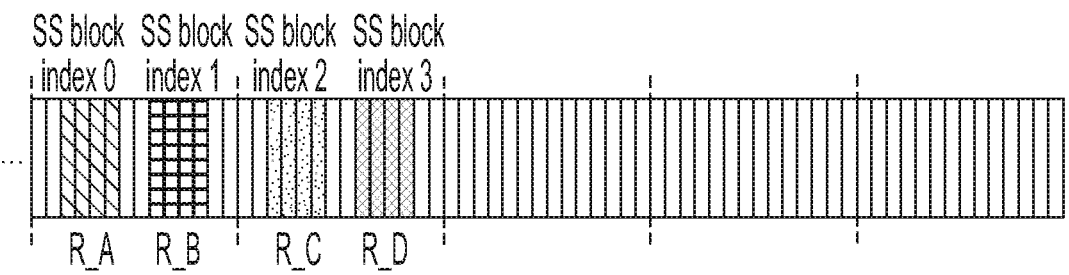
FIGS. 6A-6H show examples of some embodiments of the present disclosure.

In some embodiments, the number of SS blocks actually transmitted may be equal to the maximum number of SS blocks, that is N=L. For example, FIG. 6A shows example of such embodiments. As shown in FIG. 6A, the SS blocks 0, 1, 2 and 3 are actually transmitted by the network device, while DMRS sequences R_A, R_B, R_C and R_D correspond to the 4 SS blocks respectively.

In some embodiments, the number of SS blocks actually transmitted may be less than the maximum number of SS blocks, that is N≤L. In one embodiment, any combination of N SS blocks may be selected from the L SS blocks. Alternatively or in addition, a predetermined SS block may be always selected to be transmitted, such as, the SS block 0. In one embodiment, different patterns of SS blocks may be predefined for different values of N. Alternatively or in addition, different patterns of N SS blocks may be used for different network devices, such as different cells and/or TRPs, in order to mitigate the interference.

Figure 6B:
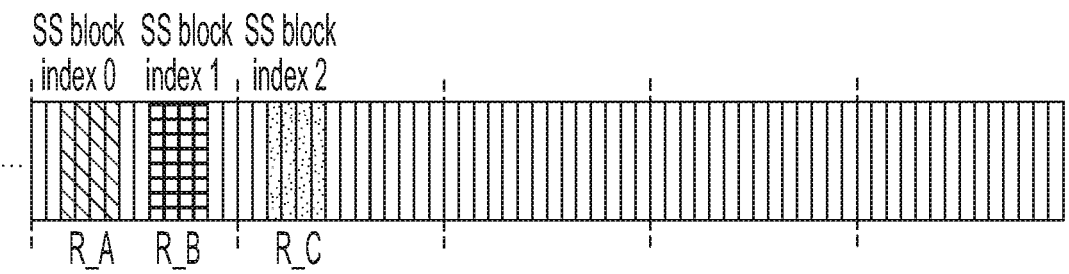

FIG. 6B shows an example in case that 3 SS blocks are actually transmitted, that is N=3. As shown in FIG. 6B, the SS blocks 0, 1 and 2 are selected, while DMRS sequences R_A, R_B and R_C correspond to the 3 SS blocks respectively.

Figure 6C:
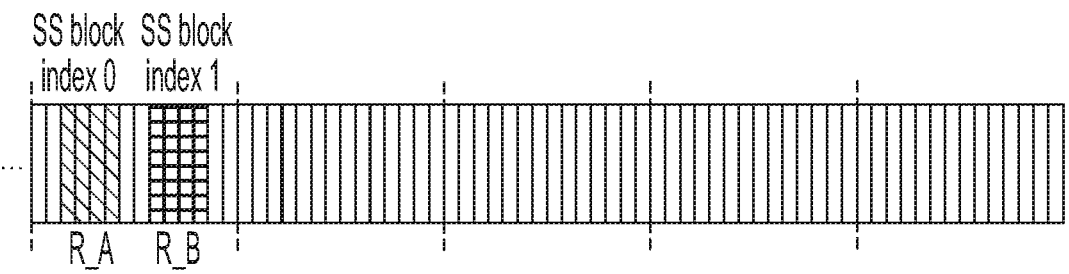

FIG. 6C shows an example in case that 2 SS blocks are actually transmitted, that is N=2. As shown in FIG. 6C, the SS blocks 0 and 1 are selected, while DMRS sequences R_A and R_B correspond to the 2 SS blocks respectively.

Figure 6D:
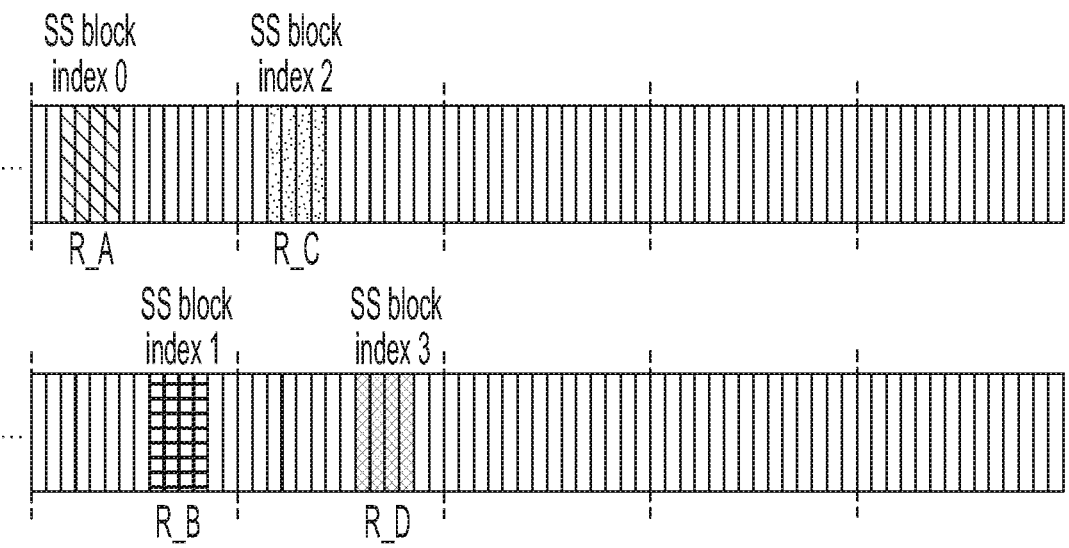

FIG. 6D shows an example in case that 2 SS blocks are actually transmitted, that is N=2. As shown in FIG. 6D, the SS blocks 0 and 2 are selected for one network device (for example, cell and/or TRP), while the SS blocks 1 and 3 are selected for another network device, in order to mitigate the interference. Similarly, DMRS sequences R_A and R_C correspond to the SS blocks 0 and 2 respectively; while DMRS sequences R_B and R_D correspond to the SS blocks 1 and 3 respectively.

Figure 6E:
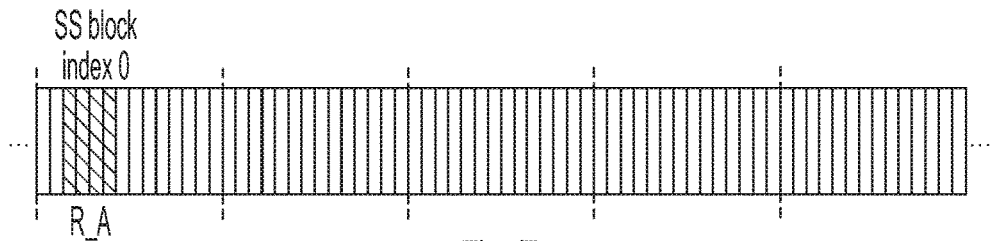

FIG. 6E shows an example in case that 1 SS block is actually transmitted, that is N=1. As shown in FIG. 6E, the SS block 0 is selected, while DMRS sequences R_A corresponds to the SS block 0.

Figure 6F:
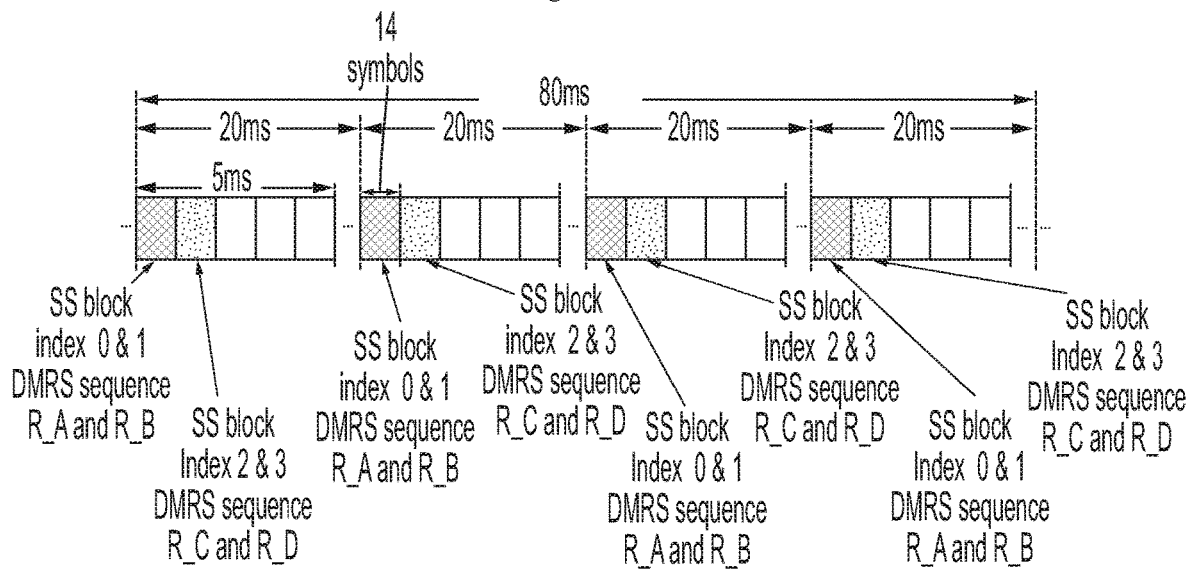

In some embodiments, 3 bits of the index of a SS block within a SS block burst set ($b_5, \ldots, b_1, b_0$) may be carried by the DMRS sequence associated with the SS block. For example, if 3 bits of the index are carried by the DMRS sequence, there may be 8 values of the SS block index $n_{SS}$ for calculating the initial value c_init, and thus there may be 8 DMRS sequences corresponding to the 8 values respectively. In this case, 4 of the 8 DMRS sequences may be selected as DMRS sequences for PBCH. FIG. 6F shows an example of such embodiments. In the following description, suppose that the maximum 4 SS blocks are indexed with 0, 1, 2 and 3 respectively. The 8 generated DMRS sequences are indexed with R_A, R_B, R_C, R_D, R_E, R_F, R_G and R_H respectively, and the 4 selected DMRS sequences for PBCH are DMRS sequences R_A, R_B, R_C and R_D.

FIG. 6F shows 4 SS block burst sets in one 80 ms duration, in which each element may represent 1 ms (14 symbols). As shown in FIG. 6F, in one duration of 80 ms, there may be at least 4 SS block burst sets, each of which is within a 5 ms window. In one embodiment, within each duration of 20 ms, the respective SS block burst set at the same position may be associated with the same mapping of DMRS sequences and SS block indices. For different durations of 20 ms, different scrambling sequences or CRC masks for PBCH may be applied. For example, the 4 scrambling sequences or CRC masks for PBCH may be indexed with S_A, S_B, S_C and S_D respectively. As such, the symbol index and slot index of a SS block within a 5 ms window may be carried by the DMRS sequence associated with the SS block. The half frame indication may be included in PBCH payload with a size of 1 bit. Within the duration of 80 ms, the respective index for each duration of 20 ms may be carried by the scrambling sequence or CRC mask for PBCH. In addition, there may be a field with a size of 7 bits in PBCH payload for indicating different durations of 80 ms. The terminal device may combine the PBCH in the order of S_A, S_B, S_C and S_D. In other words, if the terminal device detects a PBCH scrambled or masked with the sequence S_D, the PBCH may not be combined with the following detected PBCH (which may be scrambled or masked with the sequence S_A).

Figure 6G:
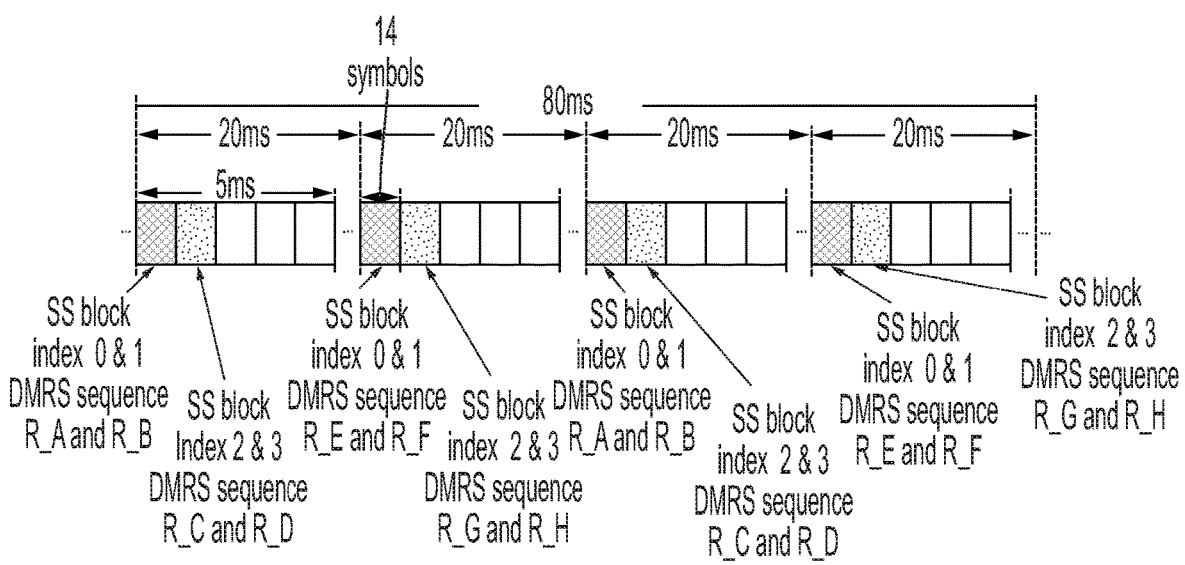
Figure 6H:
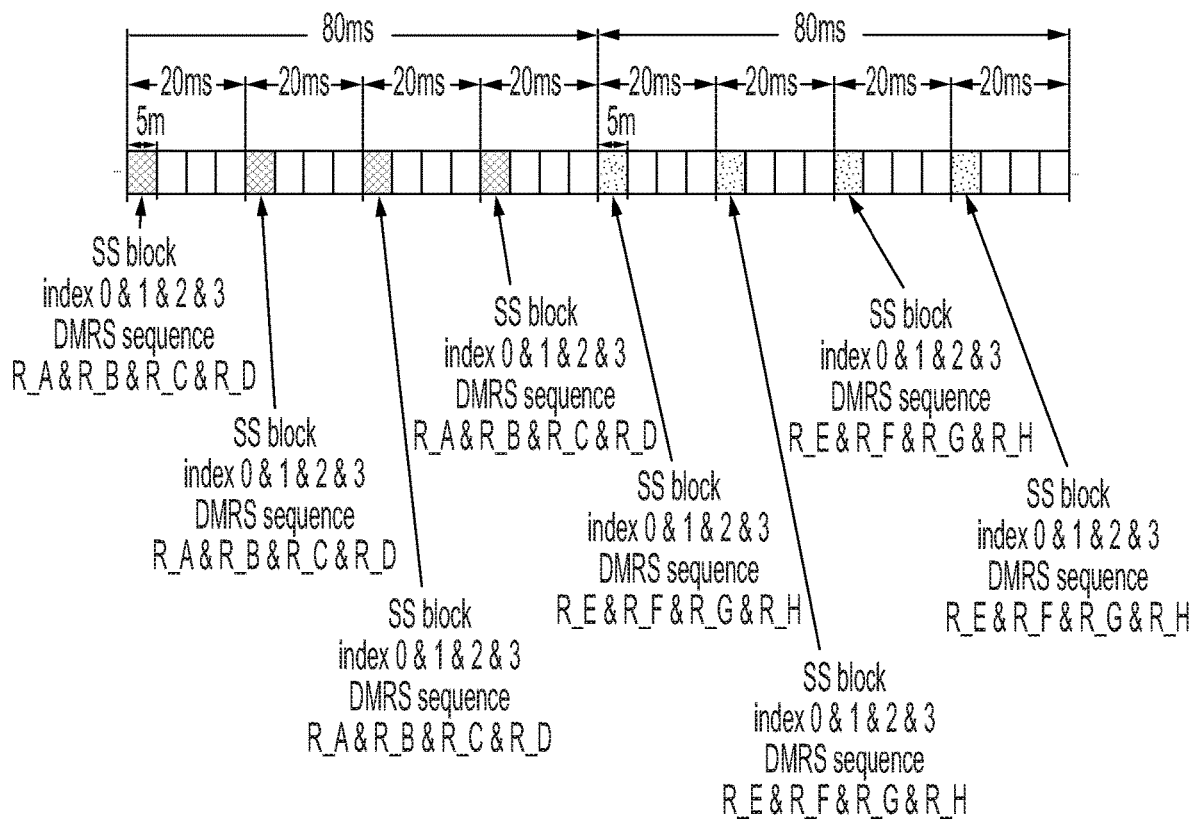

In some embodiments, 3 bits of the index of a SS block within a SS block burst set ($b_5, \ldots, b_1, b_0$) may be carried by the DMRS sequence associated with the SS block. For example, if 3 bits of the index are carried by the DMRS sequence, there may be 8 values of the SS block index $n_{SS}$ for calculating the initial value c_init, and thus there may be 8 DMRS sequences corresponding to the 8 values respectively. In this case, all of the 8 DMRS sequences may be selected as DMRS sequences for PBCH. FIGS. 6G and 6H show examples of such embodiments. In the following description, suppose that the maximum 4 SS blocks are indexed with 0, 1, 2 and 3 respectively. The 8 DMRS sequences for PBCH are indexed with R_A, R_B, R_C, R_D, R_E, R_F, R_G and R_H respectively.

In one embodiment, for example, FIG. 6G shows 4 SS block burst sets in one 80 ms duration, in which each element may represent 1 ms (14 symbols). As shown in FIG. 6G, in one duration of 80 ms, there may be at least 4 SS block burst sets, each of which is within a 5 ms window. In some embodiment, for example as shown in FIG. 6G, the first 20 ms duration and the third 20 ms duration may be associated with the same group of DMRS sequences, while the second 20 ms duration and the fourth 20 ms duration may be associated with the same group of DMRS sequences. However, the first 20 ms duration and the second 20 ms duration may be associated with different groups of DMRS sequences. For different SS block burst sets associated with the same group of DMRS sequences, different scrambling sequences or CRC masks for PBCH may be applied. For example, the 2 scrambling sequences or CRC masks for PBCH may be indexed with S_A and S_B respectively. As such, the symbol index and slot index of a SS block within a 5 ms window may be carried by the DMRS sequence associated with the SS block. The half frame indication may be included in PBCH payload with a size of 1 bit. Within the duration of 80 ms, the respective index for each duration of 20 ms may be carried by a combination of DMRS sequences and a scrambling sequence or CRC mask for PBCH. In addition, there may be a field with a size of 7 bits in PBCH payload for indicating different durations of 80 ms. The terminal device may combine the PBCH in the order of S_A and S_B. In other words, if the terminal device detects a PBCH scrambled or masked with the sequence S_B, the PBCH may not be combined with the following detected PBCH (which may be scrambled or masked with the sequence S_A).

In another embodiment, for example, FIG. 6H shows two durations of 80 ms, each of which consists of 4 durations of 20 ms. As shown in FIG. 6H, within each duration of 20 ms in one 80 ms duration, the respective SS block burst set at the same position may be associated with the same mapping of DMRS sequences and SS block indices. For different durations of 20 ms in one 80 ms duration, different scrambling sequences or CRC masks for PBCH may be applied. For example, the 4 scrambling sequences or CRC masks for PBCH may be indexed with S_A, S_B, S_C and S_D respectively. For different durations of 80 ms, different group of DMRS sequences for PBCH may be applied, which can be used to indicate a part of SFN. For example, as shown in FIG. 6H, for the first 80 ms duration, the maximum 4 SS blocks may be associated with DMRS sequences R_A, R_B, R_C and R_D; while for the second 80 ms duration, the maximum 4 SS blocks may be associated with DMRS sequences R_E, R_F, R_G and R_H. As such, the symbol index and slot index of a SS block within a 5 ms window may be carried by the DMRS sequence associated with the SS block. The half frame indication may be included in PBCH payload with a size of 1 bit. Within a duration of 80 ms, the respective index for each duration of 20 ms may be carried by the scrambling sequence or CRC mask for PBCH. In addition, there may be a field with a size of 6 bits (instead of 7 bits, since different group of DMRS sequences for PBCH are used to indicate a part of SFN) in PBCH payload for indicating different durations of 80 ms. The terminal device may combine the PBCH in the order of S_A, S_B, S_C and S_D. In other words, if the terminal device detects a PBCH scrambled or masked with the sequence S_D, the PBCH may not be combined with the following detected PBCH (which may be scrambled or masked with the sequence S_A).

Figure 7A:
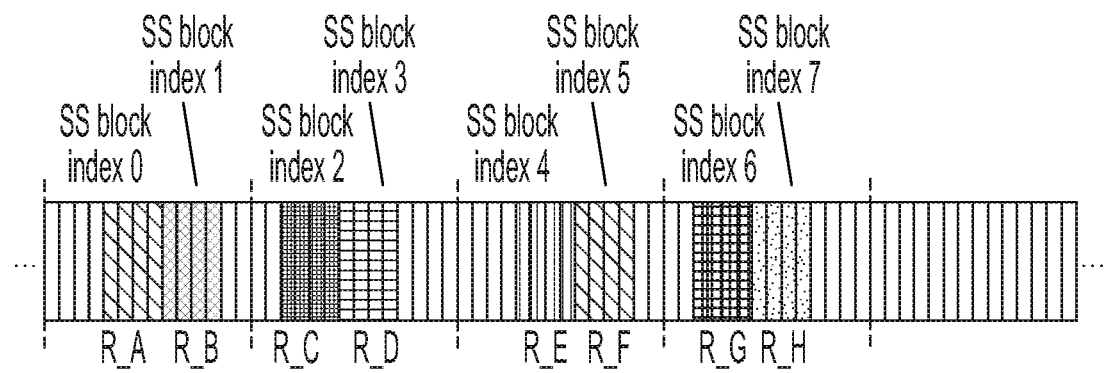
FIGS. 7A-7C show examples of some embodiments of the present disclosure.
Figure 7B:
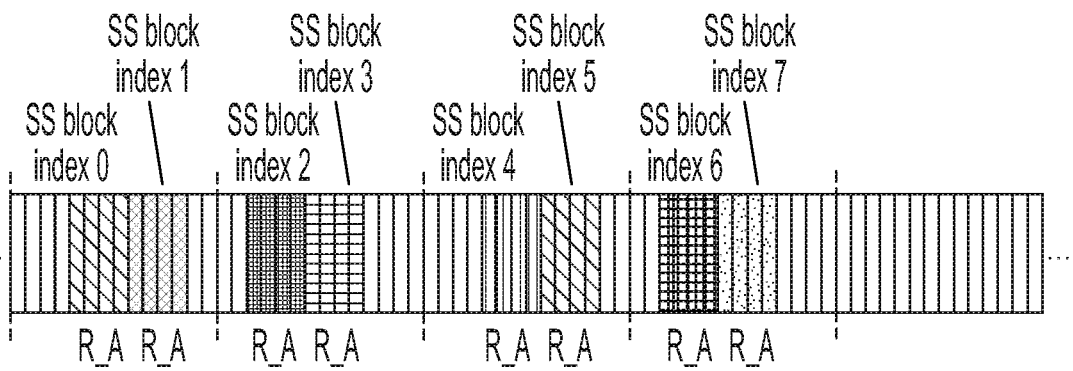
Figure 7C:
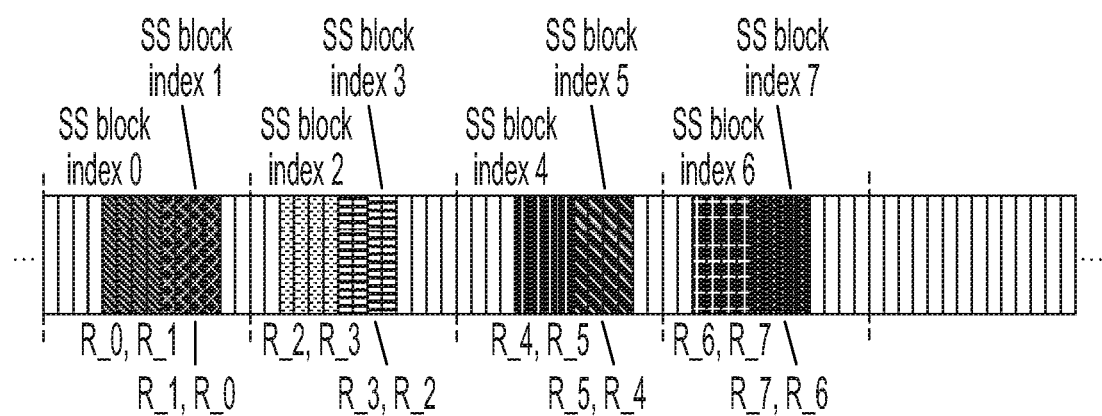

FIGS. 7A-7C show examples of the mapping of SS blocks to slots in case that the value of subcarrier spacing is 120 KHz and the maximum number of SS blocks within a SS block burst set is 64 according to some embodiments of the present disclosure. As shown in FIG. 4, in the case of 120 KHz SCS and L=64, 4 slots may be included in a 0.5 ms window, each of which may contain up to 2 SS blocks. That is, up to 8 SS blocks may include in a 0.5 ms window. Suppose that the maximum 8 SS blocks are indexed with 0, 1, . . . , 8 respectively.

In some embodiments, as shown in FIG. 7A, in one 0.5 ms window, 8 different DMRS sequences or DMRS sequence groups may be alternated to indicate a part of an index of a SS block within a SS block burst set. For example, the 8 different DMRS sequences or DMRS sequence groups may be indexed with R_A, R_B, R_C, R_D, R_E, R_F, R_G and R_H. For different durations of 0.5 ms, the pattern of DMRS sequences or DMRS sequence groups may be the same. As such, the index of a SS block ($b_5, \ldots, b_1, b_0$) may be carried by the DMRS sequence in connection with the PBCH payload. For example, 3 bits of the index ($b_5, \ldots, b_1, b_0$) may be carried by the DMRS sequence, while the other 3 bits of the index may be indicated in PBCH payload.

In some embodiments, as shown in FIG. 7A, a respective DMRS sequence may be fixed for each position or index of the SS block. For example, the DMRS sequence R_A may be fixed to be used for the SS block 0; the DMRS sequence R_B may be fixed to be used for the SS block 1; the DMRS sequence R_C may be fixed to be used for the SS block 2; the DMRS sequence R_D may be fixed to be used for the SS block 3; the DMRS sequence R_E may be fixed to be used for the SS block 4; the DMRS sequence R_F may be fixed to be used for the SS block 5; the DMRS sequence R_G may be fixed to be used for the SS block 6; and the DMRS sequence R_H may be fixed to be used for the SS block 7. In some embodiments, the number of SS blocks actually transmitted may be less than the maximum number of SS blocks, that is N<L. In one embodiment, a predetermined SS block may be always selected to be transmitted, such as, the SS block 0. In another embodiment, different patterns of SS blocks may be predefined for different values of N. Alternatively or in addition, the value of N may be limited to one of 32, 16, 8, 4, 2 and 1.

FIG. 7B shows another example of the mapping of SS blocks to slots in case that the value of subcarrier spacing is 120 KHz and the maximum number of SS blocks within a SS block burst set is 64 according to some embodiments of the present disclosure. As shown in FIG. 7B, in one 0.5 ms window, a same DMRS sequence or DMRS sequence group may be used. For different durations of 0.5 ms, 8 DMRS sequences or DMRS sequence groups (which are indexed with R_A, R_B, R_C, R_D, R_E, R_F, R_G and R_H respectively) may be alternated to indicate a part of an index of a SS block within a SS block burst set. As such, the index of a SS block ($b_5, \ldots, b_1, b_0$) may be carried by the DMRS sequence in connection with the PBCH payload. For example, 3 bits of the index ($b_5, \ldots, b_1, b_0$) may be carried by the DMRS sequence, while the other 3 bits of the index may be indicated in PBCH payload.

In some embodiments, as shown in FIG. 7B, a respective DMRS sequence may be fixed for each position or index of the SS block. For example, the DMRS sequence R_A may be fixed to be used for the SS block 0; the DMRS sequence R_B may be fixed to be used for the SS block 1; the DMRS sequence R_C may be fixed to be used for the SS block 2; the DMRS sequence R_D may be fixed to be used for the SS block 3; the DMRS sequence R_E may be fixed to be used for the SS block 4; the DMRS sequence R_F may be fixed to be used for the SS block 5; the DMRS sequence R_G may be fixed to be used for the SS block 6; and the DMRS sequence R_H may be fixed to be used for the SS block 7. In some embodiments, the number of SS blocks actually transmitted may be less than the maximum number of SS blocks, that is N<L. In one embodiment, a predetermined SS block may be always selected to be transmitted, such as, the SS block 0. In another embodiment, different patterns of SS blocks may be predefined for different values of N. Alternatively or in addition, the value of N may be limited to one of 32, 16, 8, 4, 2 and 1.

As described above, in some cases, for one SS block, there may be two symbols for PBCH. In this case, there may be two DMRS sequences (for example, represented by R_i and R_j, where i≠j) for the two symbols. In some embodiments, a combination of the two DMRS sequences for the two symbols may be used to indicate a part of an index of a SS block within a SS block burst set. FIG. 7C shows an example of such embodiments. As shown in FIG. 7C, in one 0.5 ms window, 8 different combinations of R_i and R_j may be alternated to carry 3 bits of the index of a SS block ($b_5, \ldots, b_1, b_0$). For different durations of 0.5 ms, the pattern of the combinations of R_i and R_j may repeated. There may be a field with a size of 3 bits in PBCH payload for indicating different durations of 0.5 ms (that is, the other 3 bits of the index ($b_5, \ldots, b_1, b_0$)). Alternatively, in another embodiment, in one 0.5 ms window, a same combination of R_i and R_j may be used; while for different SS blocks, the respective values of the field with a size of 3 bits in PBCH payload may be different. That is, 3 bits of the index of a SS block ($b_5, \ldots, b_1, b_0$) may be indicated in the field with a size of 3 bits in PBCH payload. For different durations of 0.5 ms, 8 different combinations of R_i and R_j may be alternated to carry the other 3 bits of the index ($b_5, \ldots, b_1, b_0$). Alternatively, in yet another embodiment, for each SS block index, the respective combination of R_i and R_j may be different. That is, the 6 bits of the index ($b_5, \ldots, b_1, b_0$) may be carried by the combination of R_i and R_j, and thus the bits in PBCH payload may indicate other information instead of the index of a SS block with a SS block burst set. Alternatively or in addition, in some embodiments, a respective DMRS sequence may be fixed for each position or index of the SS block. If the number of SS blocks actually transmitted may be less than the maximum number of SS blocks, that is N<L, a predetermined SS block may be always selected to be transmitted, such as, the SS block 0. In another embodiment, different patterns of SS blocks may be predefined for different values of N. Alternatively or in addition, the value of N may be limited to one of 32, 16, 8, 4, 2 and 1.

In some embodiments, a DMRS sequence may be used to indicate both an index of a SS block within a SS block burst set and the number of SS blocks actually transmitted. For example, in case that the value of subcarrier spacing is 15 KHz and the maximum number of SS blocks within a SS block burst set is 4, that is L=4, the number of SS blocks actually transmitted may be N. If N=4, the DMRS sequences used for PBCH may be DMRS sequences R_A, R_B, R_C and R_D. If N=2, the DMRS sequences used for PBCH are DMRS sequences R_E and R_F. If N=1, the DMRS sequence used for PBCH are DMRS sequence R_G.

In some embodiments, a DMRS sequence combination (that is, a combination of R_i and R_j) may be used to indicate both an index of a SS block within a SS block burst set and the number of SS blocks actually transmitted. For example, in case that the value of subcarrier spacing is 15 KHz and the maximum number of SS blocks within a SS block burst set is 4, that is L=4, the number of SS blocks actually transmitted may be N. If N=4, the DMRS sequence combination for one SS block may be (R_i0, R_i1). If N=2, the DMRS sequence combination for one SS block may be (R_j0, R_j1). If N=1, the DMRS sequence combination for one SS block may be (R_k0, R_k1). (R_i0, R_i1), (R_j0, R_j1) and (R_k0, R_k1) may represent different DMRS sequence combinations respectively. As such, the terminal device can obtain the number of SS blocks actually transmitted and indices of SS blocks at the same time once the detection of DMRS for PBCH is completed. Then, the terminal device can receive different sizes of Physical Random Access Channel (PRACH) resources/preambles associated with the SS blocks. For example, the size of the set of PRACH resources/preambles may be the same as the number of SS blocks actually transmitted.

In some embodiments, for different frequency ranges, the (maximum) number of bits for SS block index indication in QCL parameters between other RS or channels and SS blocks may be different. For example, the other RS may be CSI-RS. In one embodiment, for frequency range up to 3 GHz, the (maximum) number of bits for QCL indication may be 2. In another embodiment, for frequency range from 3 GHz to 6 GHz, the (maximum) number of bits for QCL indication may be 3. In yet another embodiment, for frequency range from 6 GHz to 52.6 GHz, the (maximum) number of bits for QCL indication may be 6.

In some embodiments, for different numbers of SS blocks actually transmitted, the number of bits for SS block index indication in QCL parameters may be different. For example, the actually transmitted number of SS blocks is N, the number of bits for SS block index indication in QCL parameters may be ceil(log 2(N)).

In some embodiments, for different numbers of SS blocks actually transmitted, the value of the SS block index indication in QCL parameters may be different. Alternatively or in addition, the value of the SS block index indication in QCL parameters may correspond to a respective index of one of the number of SS blocks actually transmitted. For example, as shown in Table 2, if L=4 and N=4, the 4 SS blocks actually transmitted are numbered the same as the 4 maximum SS blocks within a SS block burst set. For example, the 4 maximum SS blocks are indexed with 0, 1, 2 and 3. The respective values of the SS block index indication in QCL parameters associated with the 4 SS blocks may equal to 0, 1, 2 and 3, respectively.

TABLE 2

| SS block index indication in QCL parameters | SS block Index |
|---|---|
| '00' | 0 |
| '01' | 1 |

TABLE 2-continued

| SS block index indication in QCL parameters | SS block Index |
|---|---|
| '10' | 2 |
| '11' | 3 |

For another example, as shown in Table 3 or Table 4, if L=4 and N=2, the 2 SS blocks actually transmitted may be selected as the SS blocks (0, 2) or (0, 1). In this case, the number of bits for SS block index indication in QCL parameters may be 1.

TABLE 3

| SS block index indication in QCL parameters | SS block Index |
|---|---|
| '0' | 0 |
| '1' | 2 |

TABLE 4

| SS block index indication in QCL parameters | SS block Index |
|---|---|
| '0' | 0 |
| '1' | 1 |

In some embodiments, the indices of the SS blocks actually transmitted may be informed, by the network device, to the terminal device. In some embodiments, an unused SS block index can be used for dynamic downlink and uplink switch or transmission for other channels/signals. In some embodiments, the indication for SS blocks actually transmitted may include at least one of the following: the number of SS blocks actually transmitted, the indices of SS blocks actually transmitted, the periodicity of SS blocks actually transmitted and the offset of SS blocks actually transmitted. In some embodiments, for different values of subcarrier spacing, different frequency ranges, different maximum numbers of SS blocks and/or different periodicities of SS blocks, the offsets thereof may be different. In one embodiment, the offset may be a multiple of 5 ms and no larger than the value of the respective periodicity. For example, for a periodicity of 20 ms, the offset of SS blocks actually transmitted may be one of {0, 5, 10, 15} ms; while for a periodicity of 10 ms, the offset of SS blocks actually transmitted may be one of {0, 5} ms.

It should be understood that the above examples are only for the purpose of illustration without suggesting any limitations to the present disclosure. The present disclosure is not necessarily limited to the above examples as illustrated above. Rather, more features and/or examples, such as with respect to different frequency ranges and/or values of subcarrier spacing, can be conceived by those skilled in the art in view of the teachings of the present disclosure.

Figure 8:
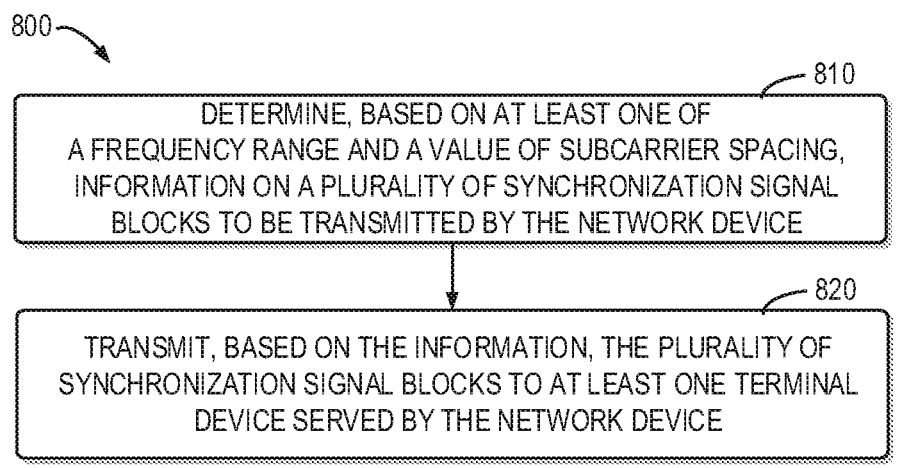
FIG. 8 shows a flowchart of an example method in accordance with some embodiments of the present disclosure.

FIG. 8 shows a flowchart of an example method 800 in accordance with some embodiments of the present disclosure. The method 800 can be implemented at a network device 110 as shown in FIG. 1. For the purpose of discussion, the method 800 will be described from the perspective of the network device 110 with reference to FIG. 1.

In act 810, the network device 110 determines, based on at least one of a frequency range and a value of subcarrier spacing, information on a plurality of synchronization signal (SS) blocks to be transmitted by the network device, the information at least in part indicating timing information for transmitting the plurality of SS blocks.

In act 820, the network device 110 transmits, based on the information, the plurality of SS blocks to at least one terminal device served by the network device.

In some embodiments, determining the information on the plurality of SS blocks comprises: determining first information on Physical Broadcast Channel (PBCH), the first information including at least one of the following: a payload size for PBCH, second information on one or more fields in PBCH, periodicity of the plurality of SS blocks, the number of scrambling sequences for PBCH, the number of demodulation reference signal (DMRS) sequences for PBCH, mapping information on the scrambling sequences for PBCH, mapping information on the DMRS sequences for PBCH.

In some embodiments, transmitting the plurality of SS blocks comprises: transmitting, based on the first information on PBCH, the plurality of SS blocks.

In some embodiments, the second information on the one or more fields in PBCH includes at least one of the following: whether each of the one or more fields is included in PBCH; and a respective size of each of the one or more fields.

In some embodiments, determining the information on the plurality of SS blocks further comprises: determining, based on at least one of the frequency range and the value of subcarrier spacing, a maximum number of SS blocks within a SS burst set; and determining, at least based on the maximum number of SS blocks in a SS burst set, the number of the plurality of SS blocks to be transmitted by the network device, the plurality of SS blocks being included in the maximum number of SS blocks with same indexing.

In some embodiments, the plurality of SS blocks include a first SS block. Determining the information on the plurality of SS blocks further comprises: determining index information associated with the first SS block, the index information including at least one of a system frame number (SFN), a slot index, a symbol index and a SS block index within a SS burst set; and transmitting the plurality of SS blocks comprises: transmitting, based on the index information, the first SS block.

In some embodiments, the method 800 further comprises: indicating, in the one or more fields in PBCH associated with the first SS block, at least part of the index information to the at least one terminal device.

In some embodiments, the method 800 further comprises: indicating, by a DMRS sequence for PBCH associated with the first SS block, at least part of the index information to the at least one terminal device.

In some embodiments, the method 800 further comprises: indicating, by a scrambling sequence or a CRC mask for PBCH associated with the first SS block, at least part of the index information to the at least one terminal device.

In some embodiments, the method 800 further comprises: indicating, by a combination of DMRS sequences in different symbols associated with the first SS block, at least part of the index information to the at least one terminal device.

In some embodiments, the method 800 further comprises: determining, at least in part based on the index information, a DMRS sequence for PBCH associated with the first SS block; and transmitting the DMRS sequence to the terminal devices.

Figure 9:
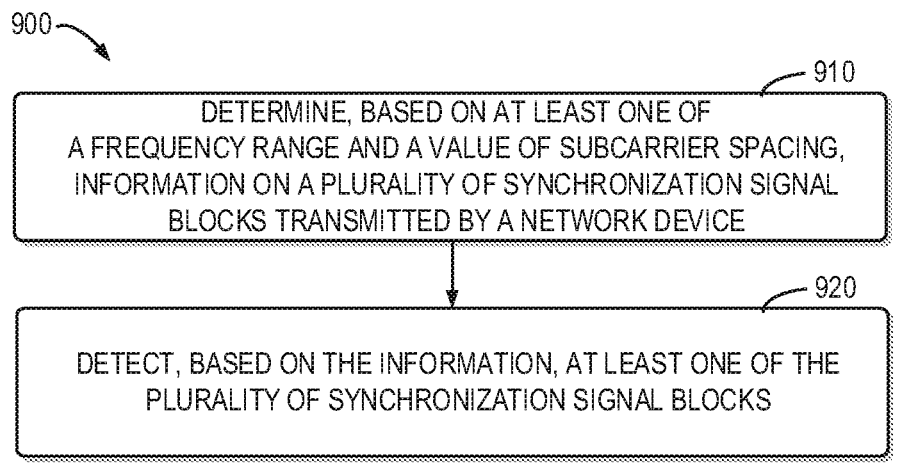
FIG. 9 shows a flowchart of an example method in accordance with some embodiments of the present disclosure.

FIG. 9 shows a flowchart of an example method 900 in accordance with some embodiments of the present disclosure. The method 900 can be implemented at a terminal device 120 as shown in FIG. 1. For the purpose of discussion, the method 900 will be described from the perspective of the terminal device 120 with reference to FIG. 1.

In act 910, the terminal device 120 determines, based on at least one of a frequency range and a value of subcarrier spacing, information on a plurality of synchronization signal (SS) blocks transmitted by a network device, the information at least in part indicating timing information for transmitting the plurality of SS blocks by the network device.

In act 920, the terminal device 120 detects, based on the information, at least one of the plurality of SS blocks.

In some embodiments, determining the information on the plurality of SS blocks comprises: determining first information on Physical Broadcast Channel (PBCH), the first information including at least one of the following: a payload size for PBCH, second information on one or more fields in PBCH, periodicity of the plurality of SS blocks, the number of scrambling sequences for PBCH, the number of demodulation reference signal (DMRS) sequences for PBCH, mapping information on the scrambling sequences for PBCH, mapping information on the DMRS sequences for PBCH.

In some embodiments, detecting the plurality of SS blocks comprises: detecting, based on the first information on PBCH, the at least one of the plurality of SS blocks.

In some embodiments, the second information on the one or more fields in PBCH includes at least one of the following: whether each of the one or more fields is included in PBCH; and a respective size of each of the one or more fields.

In some embodiments, the plurality of SS blocks include a first SS block. Determining the information on the plurality of SS blocks further comprises: determining index information associated with the first SS block, the index information including at least one of a system frame number (SFN), a slot index, a symbol index and a SS block index within a SS burst set. Detecting the plurality of SS blocks comprises: detecting, based on the index information, the first SS block.

In some embodiments, determining the index information comprises: determining at least part of the index information from one or more fields in PBCH associated with the first SS block.

In some embodiments, determining the index information comprises: determining at least part of the index information from a DMRS sequence for PBCH associated with the first SS block.

In some embodiments, determining the index information comprises: determining at least part of the index information from a scrambling sequence or a CRC mask for PBCH associated with the first SS block.

In some embodiments, determining the index information comprises: determining at least part of the index information from a combination of DMRS sequences in different symbols associated with the first SS block.

Figure 10:
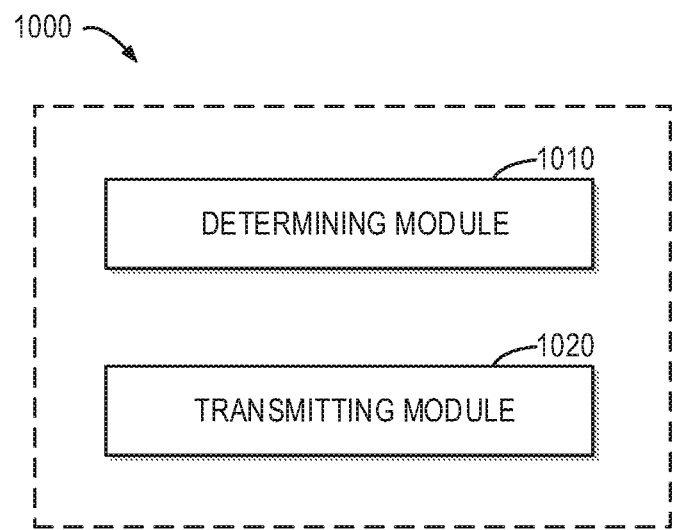
FIG. 10 is a block diagram of a network device in accordance with some embodiments of the present disclosure.

FIG. 10 shows a block diagram of an apparatus 1000 in accordance with some embodiments of the present disclosure. The apparatus 1000 can be considered as an example implementation of the network device 110 as shown in FIG. 1. As shown, the apparatus 1000 includes a determining module 1010 configured to determine, based on at least one of a frequency range and a value of subcarrier spacing, information on a plurality of synchronization signal (SS) blocks to be transmitted by the network device, the information at least in part indicating timing information for transmitting the plurality of SS blocks. The apparatus 1200 also includes a transmitting module 1020 configured to transmit, based on the information, the plurality of SS blocks to at least one terminal device served by the network device.

Figure 11:
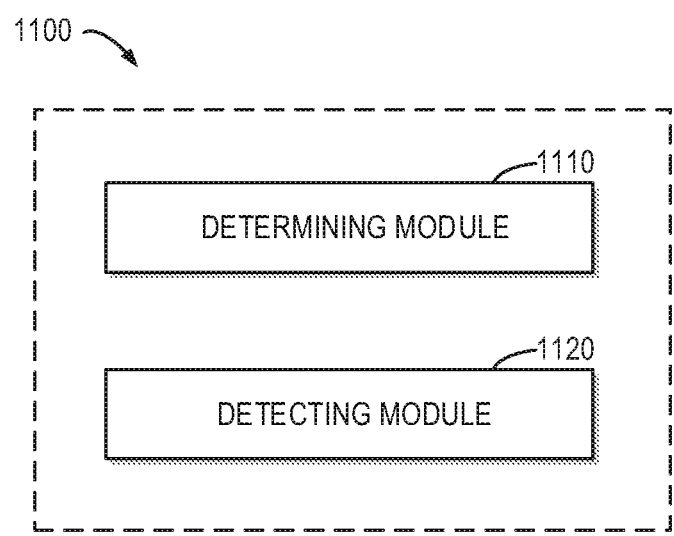
FIG. 11 is a block diagram of a terminal device in accordance with some embodiments of the present disclosure.

FIG. 11 shows a block diagram of an apparatus 1100 in accordance with some embodiments of the present disclosure. The apparatus 1100 can be considered as an example implementation of the terminal device 120 as shown in FIG. 1. As shown, the apparatus 1100 includes a determining module 1110 configured to determine, based on at least one of a frequency range and a value of subcarrier spacing, information on a plurality of synchronization signal (SS) blocks transmitted by a network device serving the terminal device, the information at least in part indicating timing information for transmitting the plurality of SS blocks by the network device. The apparatus 1120 also includes a detecting module 1320 configured to detect, based on the information, at least one of the plurality of SS blocks.

For the sake of clarity, FIGS. 10 and/or 11 do not illustrate some optional modules of the apparatuses 1000 and/or 1100. However, it should be understood that various features as described with reference to FIGS. 1-8 are likewise applicable to the apparatuses 1000 and various features as described with reference to FIGS. 1-7 and 9 are likewise applicable to the apparatuses 1100. Moreover, respective modules of the apparatuses 1000 and/or 1100 may be hardware modules or software modules. For example, in some embodiments, the apparatuses 1000 and/or 1100 may be implemented partially or completely by software and/or firmware, e.g., implemented as a computer program product embodied on the computer-readable medium. Alternatively, or in addition, the apparatuses 1000 and/or 1100 may be partially or completely implemented based on hardware, e.g., implemented as an integrated circuit (IC), an application-specific integrated circuit (ASIC), a system on chip (SOC), a field programmable gate array (FPGA) and the like. The scope of the present disclosure is not limited in this aspect.

Figure 12:
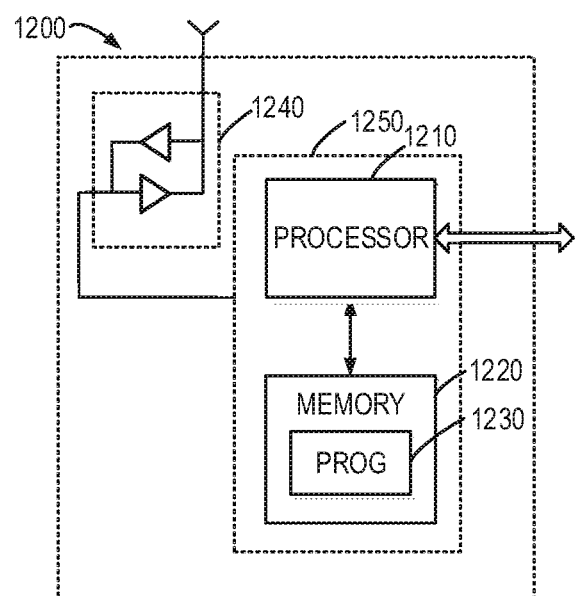
FIG. 12 is a simplified block diagram of a device that is suitable for implementing embodiments of the present disclosure.

FIG. 12 is a simplified block diagram of a device 1200 that is suitable for implementing embodiments of the present disclosure. The device 1200 can be considered as a further example implementation of a network device 110 or a terminal device 120 as shown in FIG. 1. Accordingly, the device 1200 can be implemented at or as at least a part of the network device 110 or the terminal device 120.

As shown, the device 1200 includes a processor 1210, a memory 1220 coupled to the processor 1210, a suitable transmitter (TX) and receiver (RX) 1240 coupled to the processor 1210, and a communication interface coupled to the TX/RX 1240. The memory 1210 stores at least a part of a program 1230. The TX/RX 1240 is for bidirectional communications. The TX/RX 1240 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1230 is assumed to include program instructions that, when executed by the associated processor 1210, enable the device 1200 to operate in accordance with the embodiments of the present disclosure, as discussed herein with reference to FIGS. 1 to 11. The embodiments herein may be implemented by computer software executable by the processor 1210 of the device 1200, or by hardware, or by a combination of software and hardware. The processor 1210 may be configured to implement various embodiments of the present disclosure. Furthermore, a combination of the processor 1210 and memory 1210 may form processing means 1250 adapted to implement various embodiments of the present disclosure.

The memory 1210 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1210 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a network device, comprising:
    determining, based on at least one of a frequency range and a value of subcarrier spacing, information on a plurality of synchronization signal (SS) blocks to be transmitted by the network device, the information at least in part indicating timing information for transmitting the plurality of SS blocks; and
    transmitting, based on the information, the plurality of SS blocks to at least one terminal device served by the network device,
    wherein the determining the information on the plurality of SS blocks comprises determining first information on Physical Broadcast Channel (PBCH), the first information including at least one of the following: a payload size for PBCH, second information on one or more fields in PBCH, periodicity of the plurality of SS blocks, the number of scrambling sequences for PBCH, the number of demodulation reference signal (DMRS) sequences for PBCH, mapping information on the scrambling sequences for PBCH, mapping information on the DMRS sequences for PBCH,
    wherein the transmitting the plurality of SS blocks comprises transmitting, based on the first information on PBCH, the plurality of SS blocks, and
    wherein the determining the information on the plurality of SS blocks further comprises:
        determining, based on at least one of the frequency range and the value of subcarrier spacing, a maximum number of SS blocks within a SS burst set and
        determining, at least based on the maximum number of SS blocks in a SS burst set, the number of the plurality of SS blocks to be transmitted by the network device, the plurality of SS blocks being included in the maximum number of SS blocks with same indexing.

2. The method of claim 1, wherein the second information on the one or more fields in PBCH includes at least one of the following:
    whether each of the one or more fields is included in PBCH; and
    a respective size of each of the one or more fields.

3. The method of claim 1, wherein the plurality of SS blocks include a first SS block,
    determining the information on the plurality of SS blocks further comprises:
        determining index information associated with the first SS block, the index information including at least one of a system frame number (SFN), a slot index, a symbol index and a SS block index within a SS burst set; and
    transmitting the plurality of SS blocks comprises:
        transmitting, based on the index information, the first SS block.

4. The method of claim 3, wherein the method further comprises:
    indicating, in the one or more fields in PBCH associated with the first SS block, at least part of the index information to the at least one terminal device.

5. The method of claim 3, wherein the method further comprises:
    indicating, by a DMRS sequence for PBCH associated with the first SS block, at least part of the index information to the at least one terminal device.

6. The method of claim 3, wherein the method further comprises:
    indicating, by a scrambling sequence or a CRC mask for PBCH associated with the first SS block, at least part of the index information to the at least one terminal device.

7. The method of claim 3, wherein the method further comprises:
    indicating, by a combination of DMRS sequences in different symbols associated with the first SS block, at least part of the index information to the at least one terminal device.

8. The method of claim 3, wherein the method further comprises:
    determining, at least in part based on the index information, a DMRS sequence for PBCH associated with the first SS block; and
    transmitting the DMRS sequence to the terminal devices.

9. A method implemented in a terminal device, comprising:
    determining, based on at least one of a frequency range and a value of subcarrier spacing, information on a plurality of synchronization signal (SS) blocks transmitted by a network device serving the terminal device, the information at least in part indicating timing information for transmitting the plurality of SS blocks by the network device, the plurality of SS blocks being included in a maximum number of SS blocks with same indexing; and detecting, based on the information, at least one of the plurality of SS blocks, wherein the determining the information on the plurality of SS blocks comprises determining first information on Physical Broadcast Channel (PBCH), the first information including at least one of the following: a payload size for PBCH, second information on one or more fields in PBCH, periodicity of the plurality of SS blocks, the number of scrambling sequences for PBCH, the number of demodulation reference signal (DMRS) sequences for PBCH, mapping information on the scrambling sequences for PBCH, mapping information on the DMRS sequences for PBCH, and wherein the detecting the at least one of the plurality of SS blocks comprises detecting, based on the first information on PBCH, the at least one of the plurality of SS blocks.

10. The method of claim 9, wherein the second information on the one or more fields in PBCH includes at least one of the following:
whether each of the one or more fields is included in PBCH; and
a respective size of each of the one or more fields.

11. The method of claim 9, wherein the plurality of SS blocks include a first SS block,
determining the information on the plurality of SS blocks further comprises:
determining index information associated with the first SS block, the index information including at least one of a system frame number (SFN), a slot index, a symbol index and a SS block index within a SS burst set; and
detecting the plurality of SS blocks comprises:
detecting, based on the index information, the first SS block.

12. The method of claim 11, wherein determining the index information comprises:
determining at least part of the index information from one or more fields in PBCH associated with the first SS block.

13. The method of claim 11, wherein determining the index information comprises:
determining at least part of the index information from a DMRS sequence for PBCH associated with the first SS block.

14. The method of claim 11, wherein determining the index information comprises:
determining at least part of the index information from a scrambling sequence or a CRC mask for PBCH associated with the first SS block.

15. The method of claim 11, wherein determining the index information comprises:
determining at least part of the index information from a combination of DMRS sequences in different symbols associated with the first SS block.

16. A network device comprising:
a processor; and
a memory coupled to the processor and storing instructions thereon, the instructions, when executed by the processor, causing the network device to perform actions, the actions comprising:
determining, based on at least one of a frequency range and a value of subcarrier spacing, information on a plurality of synchronization signal (SS) blocks to be transmitted by the network device, the information at least in part indicating timing for transmitting the plurality of SS blocks; and transmitting, based on the information, the plurality of SS blocks to at least one terminal device served by the network device, wherein the determining the information on the plurality of SS blocks comprises determining first information on Physical Broadcast Channel (PBCH), the first information including at least one of the following: a payload size for PBCH, second information on one or more fields in PBCH, periodicity of the plurality of SS blocks, the number of scrambling sequences for PBCH, the number of demodulation reference signal (DMRS) sequences for PBCH, mapping information on the scrambling sequences for PBCH, mapping information on the DMRS sequences for PBCH, wherein the transmitting the plurality of SS blocks comprises transmitting, based on the first information on PBCH, the plurality of SS blocks, and wherein the determining the information on the plurality of SS blocks further comprises:
determining, based on at least one of the frequency range and the value of subcarrier spacing, a maximum number of SS blocks within a SS burst set and
determining, at least based on the maximum number of SS blocks in a SS burst set, the number of the plurality of SS blocks to be transmitted by the network device, the plurality of SS blocks being included in the maximum number of SS blocks with same indexing.

17. A terminal device, comprising:
a processor; and
a memory coupled to the processor and storing instructions thereon, the instructions, when executed by the processor, causing the terminal device to perform actions, the actions comprising:
determining, based on at least one of a frequency range and a value of subcarrier spacing, information on a plurality of synchronization signal (SS) blocks transmitted by a network device serving the terminal device, the information at least in part indicating timing for transmitting the plurality of SS blocks by the network device, the plurality of SS blocks being included in a maximum number of SS blocks with same indexing; and
detecting, based on the information, at least one of the plurality of SS blocks,
wherein the determining the information on the plurality of SS blocks comprises determining first information on Physical Broadcast Channel (PBCH), the first information including at least one of the following: a payload size for PBCH, second information on one or more fields in PBCH, periodicity of the plurality of SS blocks, the number of scrambling sequences for PBCH, the number of demodulation reference signal (DMRS) sequences for PBCH, mapping information on the scrambling sequences for PBCH, mapping information on the DMRS sequences for PBCH, and
wherein the detecting the at least one of the plurality of SS blocks comprises detecting, based on the first information on PBCH, the at least one of the plurality of SS blocks.

* * * * *